United States Patent
Cunningham et al.

(10) Patent No.: US 12,101,552 B2
(45) Date of Patent: Sep. 24, 2024

(54) REMOTE MONITORING METHOD USING IMAGE PROCESSING INTELLIGENCE

(71) Applicant: WAVE9 TECHNOLOGY INC., Spruce Grove (CA)

(72) Inventors: Ian Cunningham, Regina (CA); Barrett Ramstead, Regina (CA); Ricardo Mendizabal, Regina (CA); Minhajul Arifin Badhon, Saskatoon (CA)

(73) Assignee: WAVE9 TECHNOLOGY INC., Spruce Grove (CA)

(*) Notice: Subject to any disclaimer, the term of this patent is extended or adjusted under 35 U.S.C. 154(b) by 363 days.

(21) Appl. No.: 17/765,803

(22) PCT Filed: Oct. 5, 2020

(86) PCT No.: PCT/CA2020/051335
§ 371 (c)(1),
(2) Date: Mar. 31, 2022

(87) PCT Pub. No.: WO2021/062563
PCT Pub. Date: Apr. 8, 2021

(65) Prior Publication Data
US 2022/0345668 A1    Oct. 27, 2022

(30) Foreign Application Priority Data

Oct. 4, 2019  (CA) ..................... 3057655

(51) Int. Cl.
*G06T 7/70*      (2017.01)
*G06T 7/00*      (2017.01)
(Continued)

(52) U.S. Cl.
CPC ......... *H04N 23/661* (2023.01); *G06T 7/0004* (2013.01); *G06T 7/70* (2017.01);
(Continued)

(58) Field of Classification Search
CPC .... H04N 23/661; H04N 7/181; G06T 7/0004; G06T 7/70; G06T 2200/24;
(Continued)

(56) References Cited

U.S. PATENT DOCUMENTS

| 5,757,287 A | 5/1998 | Kitamura et al. |
| 2002/0019725 A1* | 2/2002 | Petite ................. G05B 23/0208 702/188 |

(Continued)

OTHER PUBLICATIONS

International Search Report mailed Jan. 12, 2021 for PCT/CA2020/051335.

*Primary Examiner* — Nimesh Patel
(74) *Attorney, Agent, or Firm* — Suiter Swantz IP

(57) ABSTRACT

A method of remote facilities monitoring for the detection of contamination, leaks or failures in petrochemical and related facilities. Remote cameras are used to capture images of equipment to be inspected, which are transmitted to a central server. A software component on the central server applies artificial intelligence and image processing methods to detect the presence of anomalies in the images for display to an operator and potential subsequent dispatch of in person follow-up. Parallel data streams from sensors at the remote sites can be used by the software on the server to enhance the level of confidence in anomaly detection. The server software uses an adaptive object-detection function to analyze image data and learns over time to provide enhanced detection of interest regions and failure conditions.

39 Claims, 12 Drawing Sheets

(51) Int. Cl.
   *G06V 10/776* (2022.01)
   *G06V 20/52* (2022.01)
   *G08B 21/18* (2006.01)
   *H04N 7/18* (2006.01)
   *H04N 23/661* (2023.01)

(52) U.S. Cl.
   CPC ............ *G06V 10/776* (2022.01); *G06V 20/52* (2022.01); *G08B 21/187* (2013.01); *H04N 7/181* (2013.01); *G06T 2200/24* (2013.01); *G06T 2207/10016* (2013.01); *G06T 2207/30108* (2013.01); *G06T 2207/30232* (2013.01)

(58) Field of Classification Search
   CPC . G06T 2207/10016; G06T 2207/30108; G06T 2207/30232; G06T 13/80; G06T 2207/10004; G06T 7/11; G06T 19/00; G06T 2207/30004; G06T 7/0012; G06V 10/776; G06V 20/52; G06V 10/54; G06V 10/44; G06V 10/56; G06V 10/95; G06V 30/1423; G06V 10/19; G06V 40/172; G06V 40/161; G06V 20/20; G06V 40/173; G06V 40/20; G06V 40/23; G06V 10/225; G06V 10/40; G06V 10/70; G06V 10/75; G06V 10/7792; G06V 20/44; G06V 20/49; G06V 20/53; G06V 20/54; G06V 20/60; G06V 20/95; G06V 20/80; G06V 40/10; G06V 40/103; G06V 40/19; G06V 10/25; G06V 10/765; G06V 10/96; G06V 20/698; G06V 10/987; G08B 21/187; G08B 21/02; G08B 21/182; G08B 17/10; G08B 25/10; G08B 25/14; G08B 21/043; G08B 7/06; G08B 21/10; G08B 25/08; G08B 19/00; G08B 21/185; G08B 21/20; G08B 7/066; G08B 17/00; G08B 17/06; G08B 5/223; G08B 31/00; G08B 15/00; G08B 21/0469; G08B 21/14; G08B 21/16; G08B 25/016; G08B 21/18; G08B 7/00; G08B 13/00; G08B 17/103; G08B 25/00; G08B 21/0484; G06F 18/41; G06F 16/955; G06F 3/0488; G06F 2221/2111; G06F 21/35; G06F 21/6245; G06F 21/88; G06F 2203/0381; F17D 5/00; F17D 5/02; F17D 5/005; H04W 4/029; H04W 4/02; H04W 12/06; H04W 12/50; H04W 12/63; H04W 12/03; H04W 64/003; H04W 72/30; H04W 8/16; H04W 88/08; H04W 12/086; H04W 8/18; H04W 8/24; H04W 4/021; Y02D 10/00; Y02D 30/70; Y02D 30/50; H04M 11/04; H04M 3/567; H04M 1/724; H04M 2201/38; H04M 2242/30; H04M 1/72463; H04M 1/72454; H04M 2207/18; H04M 2201/42; H04M 2215/2026; H04M 15/8016; H04M 15/62; H04M 15/61; H04M 15/58; H04M 15/83; H04M 15/835; H04M 15/84; H04M 3/42348; F17C 2265/068; F17C 7/04; F17C 2250/032; F17C 2250/034; F17C 2250/03; F17C 2250/043; F17C 13/026; F17C 2250/036; F17C 2250/0478; F17C 2250/038; G06Q 50/10; G06Q 10/06311; G06Q 50/184; G06Q 10/0635; G06Q 50/06; G06Q 50/08; G06Q 50/26; G06Q 50/265; F16L 2101/30; F16L 55/26; F16L 55/46; G16Y 40/10; G16Y 10/30; G16Y 10/35; G16Y 20/10; G16Y 20/40; G16Y 40/50; G16Y 40/60; Y02A 20/20; Y02A 20/144; Y02A 50/2351; Y02B 90/20; Y02B 30/70; Y02B 70/30; Y02B 70/3225; Y02B 20/40; G01M 3/00; G01M 3/10; G01M 3/24; Y02P 80/10; Y02P 90/02; Y02P 90/82; Y04S 20/242; Y04S 20/222; Y04S 20/244; Y04S 40/126; Y04S 20/20; Y04S 10/40; Y04S 40/18; G05B 15/02; G05B 2219/2642; G05B 19/0425; G05B 19/048; G05B 19/4065; G05B 19/4183; G05B 19/41875; G05B 2219/2614; G05B 2219/2625; G05B 2219/32179; G05B 2219/32366; G05B 23/02; G05B 23/0243; G05B 23/0267; G07C 5/008; G07C 5/085; G07C 1/10; G07C 5/02; G07C 5/0808; G07C 5/06; G06N 20/00; G06N 3/006; G06N 3/044; G06N 3/084; G06N 3/02; G06N 3/045; G06N 3/047; G06N 3/088; G06N 3/126; G06N 5/046; G06N 7/01; G06N 3/042; G06N 3/043; G06N 3/049; G06N 3/086; G06N 5/01; G06N 5/022; G06N 5/025; H04L 12/2803; H04L 51/10; H04L 69/00; H04L 67/12
   See application file for complete search history.

(56) References Cited

U.S. PATENT DOCUMENTS

| | | | |
|---|---|---|---|
| 2002/0033759 A1* | 3/2002 | Morello | G08B 21/20 340/539.3 |
| 2010/0156632 A1* | 6/2010 | Hyland | G08B 25/08 702/188 |
| 2011/0308638 A1* | 12/2011 | Hyland | G01D 4/004 137/299 |
| 2014/0002639 A1* | 1/2014 | Cheben | G08B 21/14 348/135 |
| 2015/0316262 A1* | 11/2015 | Immer | F23N 5/00 431/2 |

* cited by examiner

REMOTE MONITORING METHOD USING IMAGE PROCESSING INTELLIGENCE

This invention is in the field of remote monitoring of oilfield facilities such as artificial lift systems, pipelines, tanks and the like and more specifically is in the area of systems and methods for non-human remote detection and monitoring of piping and storage installations and the like to detect anomalies requiring human intervention or attention and dispatching of same.

BACKGROUND

Oil and gas processing and extraction facilities and other similar petrochemical and industrial sites use human operators to visually inspect facilities for the presence of contamination in various forms such as fluid, film or vapour which might result from the collection and transport of oil emulsion, oil products or other byproducts. The presence of such contamination is used as an indicator of a potential equipment failure which might require further follow-up, repair etc.

In a most traditional context, inspection and monitoring for contamination and remediation requirements such as these was done manually, by having human operators conduct in-person inspection of facilities on a periodic basis. This is time intensive and costly.

For many companies, safety is identified as the need of highest importance—avoiding unnecessary human interaction or attendance for inspection or repair at various sites, to minimize the likelihood of human injury. Environmental risk reduction and productivity were also identified in a market scan as target areas.

In some instances, producers and operators have used cameras in combination with human review to remotely assess production and processing sites for evidence of such contamination.

This has typically been done by the installation of remote cameras which send photos from installations to be inspected wirelessly to a central location where they are visually inspected by an operator. Human inspection even using photos rather than site review requires similar high attention to detail and continual review. Human monitoring of a datastream or data repository with few anomalies has never been an effective process, since the meticulousness of the inspection required is counter to the volume of the data and makes it difficult and prone to human error. One of the benefits of the use of cameras however rather than human inspection at sites is the fact that it lowers the number of in person visits required, enhancing safety and reducing cost. If it were possible to come up with a method of remote site monitoring to monitor piping and similar production installations such as these for contamination or indication of failure that reduced the likelihood of human error, this would be highly commercially attractive. Visual inspection is key to the detection of leaks or failures and so any type of remote monitoring solution which could come up with an enhanced visual detection approach which limited the potential for human error would, it is believed, be most highly desired in the industry.

The industry has used many different types of systems in the past but there are specific requirements not being met by existing technology options. In certain prior art tools, other market entrants have rendered products which draw upon photo and sensor data but they simply display the raw data for a remote operator to visibly analyze. This maintains the need for operations staff to perform inspection and interpret data.

Added data is also available in many remote monitoring applications including in those related to piping and similar installations—pressure readings, equipment power consumption, and many numbers of different types of data can be captured and are captured in current remote monitoring applications. Reviewing the captured remote data in addition to captured remote images even further increases the likelihood of human error in a remote human inspection environment, since even further volumes of data require attention by human operators. If it were possible to come up with a method of remote monitoring that incorporated visual review of equipment and locations for evidence of contamination, failure or potential failure the monitoring of sensor data from the sites, if human error could be minimized, accuracy of detection could be maximized.

Developments in remote monitoring methodologies in general, as well as the availability of sophisticated data monitoring approaches, have been used successfully in many other industry verticals and both from a cost and efficiency perspective as well as from the perspective enhanced accuracy it is believed that responsible entities in the petrochemical and related production industries operating facilities of this type would benefit from and show significant commercial adoption of a software solution that would assist in a remote monitoring application minimizing the need for human inspection. If it were possible to conduct a higher frequency of inspections, oil leaks and the like could be more quickly addressed than current workflows allow. Asset failures and asset health could be monitored and addressed quickly, which would improve financial decision-making and production efficiency. Electronic monitoring and intelligent data analysis are believed to be able to provide significant operational improvements, given the current asset management maturity levels of many hydrocarbon producers.

SUMMARY OF THE INVENTION

The present invention is a system and method, and related components, for remote visual inspection and failure detection a plurality of monitoring locations. Each of the monitoring locations, whether they be long-range remote from the server and the central operations of the system, or in an on-site large industrial installation environment, would have at least one interest region that is primarily desired to monitor on an ongoing basis. The interest regions are areas of particular concern from the perspective of visual inspection, which of the areas most subject to failure or stress and which are in traditional environments most carefully physically inspected by on-site attendance. The interest regions are the areas within a particular view of the installation on a monitoring location which need to be inspected most carefully—for example pipe joints, valves, tank ports and the like. Any number of different types of interest regions are contemplated within the context of inspection of installations of this nature and any type of a interest region which would be understood and defined in a traditional visual inspection method will be understood to be within the scope of the present invention.

The method will be practised by providing an endpoint device at each monitoring location. The endpoint device would be a hardware interface device capable of the capture and transmission of the necessary visual views of the monitoring location and the interest regions from at least one camera associated therewith. The endpoint devices would be connected to a server for monitoring and detection in accordance with the remainder of the method of the present invention. The endpoint device would have a capture bus capable of receiving image data from at least one connected digital camera, and at least one digital camera connected to the capture bus capable of capturing images at the monitoring location and positioned with a view of the monitoring location.

In certain cases, multiple cameras might be connected to the capture bus, each of which had a view of certain areas of the monitoring location, where the location was larger. In the case of smaller installations, a single camera might be used. However, even in smaller installations it might be desired to use multiple cameras with multiple angled views of the same area at the monitoring location, which would enhance the level of certainty and prediction which could be made of anomalies by the software and the server in accordance with the remainder of the method. Any number of cameras present in a monitoring location connected to a hardware endpoint device will be understood to be within the scope of the present invention.

In some embodiments of the method, multiple hardware endpoint devices might also be used as a single monitoring location where a large number of cameras was present requiring substantial processing bandwidth, or for example even in a large spread out installation where it was simply easier to use multiple hardware endpoint devices where a large number of cameras were spaced large physical distances apart from each other. Again, the number of endpoint devices at a particular monitoring location will be understood to be capable of variance without departing from the scope of the present invention.

Each endpoint device will also include a network interface by which the endpoint device could transmit image data corresponding to images captured by the at least one digital camera connected thereto, to a remote server. The endpoint device would also include endpoint client software, capable of facilitating the capture of images from the at least one camera, conversion of captured images to image data and the construction and transmission of image data transmissions corresponding to a particular point in time image capture from the at least one camera attached thereto to a remote server.

In addition to the endpoint device and digital cameras positioned at each monitoring location being monitored within the scope of the present method, the method would also provide a server comprising a processor and memory in accordance with the prior art and general understanding of the nature of computing devices, along with an external network interface capable of receiving image data transmissions from endpoint devices that monitoring locations by at least one network. The server would have at least one human interface device connected to it by which the server could graphically display information to users and permit user interaction and data selection from a user during administration of the method.

The server would also comprise a monitoring software component comprising the necessary processor instructions to facilitate the conduct of the method by the server. Specifically the monitoring software component would include a adaptive object-detection function capable of analysing image data and identifying various objects therein. The strength and functionality of the adaptive object-detection function is key to the novelty of the present invention—not only is the function capable of identifying focus areas and failure attributes of concern in a particular captured or extracted image, but the monitoring software component is also capable of adapting the function to enhance its accuracy, each time the data is captured from the correct or incorrect execution of a monitoring loop or contextualization step in accordance with the remainder of the invention.

In execution of the method of the present invention, image capture steps would periodically be executed at each endpoint device corresponding to a monitoring location. The execution of an image capture step would first comprise, using the endpoint client software and the various hardware components thereof, capturing an image from at least one digital camera connected to the capture bus of the endpoint device. Image data corresponding to each captured image would be consolidated into a data packet for transmission to the server as an image data transmission. Upon the generation of a data packet corresponding to an image data transmission that would be transmitted to the server from the endpoint device via the network. The image capture step could be scheduled to be conducted on a timed periodic basis, or could be triggered by local sensor inputs or pulled from the server. Any number of different types of approaches to initiate an image capture step at a particular monitoring location will be understood to be within the scope of the present invention.

On receipt of a packet corresponding to an image data transmission at the server from an endpoint device, the server and the monitoring software component will conduct an extraction step, by parsing the image data transmission received into at least one extracted image of a camera view from the corresponding monitoring location.

The next step in the method will consist of contextualizing each monitoring location at least once in respect of each camera view. Contextualizing the monitoring location in respect of each camera view consists of effectively identifying the interest regions within a particular image which is desired to be visually monitored for evidence of the existence of failure conditions. The camera view will be contextualized by selecting an extracted image of the camera view recovered from the conduct of an extraction step, and applying the adaptive object-detection function to the extracted image to detect the presence of any focus cues within the extracted image signifying interest regions.

Using each identified focus cue, the software will then calculate a desired dimension and location of an interest region in respect of the extracted image, encompassing the signified interest region to be monitored. The dimensions and location of each determined interest region will be stored in respect of the corresponding camera view which is now a contextualized camera view. The focus cues will signify high-probability failure areas within each corresponding image—for example by detecting the presence of a valve or a particular type of pipe connection or the like which is known to be the subject of failure or required monitoring, this could be a focus cue used by the server to continue with the invention.

It is really only necessary to contextualize each monitoring location and define the location of the interest regions in respect of each camera view once, unless the cameras are ever moved—it is assumed that most embodiments of the hardware the present invention would rely upon fixed position cameras in respect of which the view would not change, however it will be understood that the system and method of the present invention and the monitoring software component could be adapted for wider angle or moving camera views and the necessary modifications to the software the present invention to achieve the addition of that add functionality will also be understood to be within the scope of the present invention. Any type of modification to the periodic frequency of the processing of image data transmissions for the purpose of contextualization of the monitoring location will be understood to be within the scope of the present invention.

Following the contextualization of each camera view with respect to a monitoring location, a monitoring loop is conducted using the server and the monitoring software component to detect the presence of failure conditions requiring human inspection in the particular monitoring location. This is done by, on completion of an extraction step in respect of a received image data transmission at the server pertaining to a contextualized camera view, firstly selecting the extracted image captured in respect of the contextualized camera view for analysis. The stored dimensions and location of each interest region for the contextualized camera view are then retrieved from the memory of the server.

The monitoring software component will apply the adaptive object-detection function to at least the portions of the extracted image corresponding to the stored dimensions and location of each interest region for the camera view corresponding to the extracted image, to detect the presence of any failure attributes therein which indicate the existence of the failure condition.

If any failure conditions are detected, a notification step would be executed in respect of the interest region by generating a graphic display via a human interface device in communication with the remainder of the server which displays at least the portion of the extracted image corresponding to the interest region containing the detected failure condition. The user would be permitted to validate or reject the detected failure conditions, via the human interface device and any user validation or rejection interactions with the server would be saved. Basically, the user could upon notification of an alert requiring same, conduct a human review of the imagery associated with an automated determination of the existence of failure condition and either accept the detected conditions and attributes or reject them. A physical attendance and inspection could be ordered, or the exception generated by the system could be cleared and monitoring could continue.

In certain embodiments of the notification element of the method of the present invention, the displayed to the user via the human interface device could also include markings demonstrating the specific identified failure attributes located by the monitoring software component within the image and/or a calculated certainty score with respect to the detected failure conditions.

Following the completion of the notification step, the monitoring software component would adapt the function based upon the user validation, rejection or modification interactions stored, to enhance the level of accuracy and certainty of the function in future object-detections. The failure of the user to intervene or interact with the server following a particular notification could also be considered as a ratification of the recognition or detection achieved by the function and could be used as well to strengthen the data model thereof.

By providing the alert display to a human interface device, the server will facilitate supplemental human review of a detected potential failure condition or anomaly at a particular monitoring location, and by conducting much of the initial processing automatically or using the computer, the large amount of preliminary human data review which is necessary to reliably determine the existence of the failure condition is avoided.

Where the method is being practised including a contextualization step in respect of each image data transmission received, the storage of the location and dimensions of the interest regions having already been conducted in respect of the same transmission packet might just be stored in the volatile memory of the server, or in other embodiments where the images were not contextualized on the receipt of each image data packet and the location and dimensions of the interest regions were stored on a longer-term basis in the fixed memory of the server that information can be retrieved from the disk drive or other memory operatively connected thereto. Both such approaches are contemplated within the scope of the present invention.

An image data transmission from an endpoint device to the server could contain a single image captured from a single camera connected to the endpoint device, or could contain multiple images captured from multiple cameras connected to the endpoint device. Where a single image data transmission contained more than one captured image, the software and function could process the images serially or in parallel. Both such approaches and any necessary or attendant modifications to the workflow and software will be understood to be within the scope of the present invention.

The adaptive object-detection function of the present invention will specifically be capable of identifying amorphous shapes, textures and colours or the like which might signify spills or other breaches or failure conditions, which has not been capable to date. If any type of a failure condition is detected within a particular interest region, an inspection condition exists.

As outlined above, the server would be connected to at least one human interface device which could display the display alerts and other information to users along with allowing for user interactions to validate, reject or modify recognition and decisions made by the monitoring software component. In basic embodiments of the server of the method, the human interface device could be a display and an input device such as a keyboard or the like attached directly to the server which would be capable of displaying information to a user and perhaps an attendant keyboard or other input device by which validation or rejection interactions could be facilitated.

In other embodiments, the number of human interface devices could be more than one, each of which could correspond to at least one monitoring location—each of the human interface devices in such a case could be a human interface of a remote client device of a user operatively connected to the server by the network. In embodiments with a plurality of human interface devices operatively connected to the server, they could each comprise client software or browser interfaces on one or more portable smart devices of users, or computers at remote office locations etc. Any type of an electronic device capable of facilitating human interaction as outlined in the remainder of the steps of the method of the present invention will be understood to be within the scope hereof.

As outlined, the first recognition step undertaken by the monitoring software component with the adaptive object-detection function is the contextualization of a monitoring location, wherein at least one image of a camera view captured at the monitoring location will be processed for the purpose of recognizing focused cues within the image. The focus cues are items or characteristics of the image recognizable by the function which can identify high-probability failure areas in the overall camera view corresponding to the image. The focus cues could be any number of different characteristics or items recognizable by the function in respect of the physical appearance of the monitoring location. For example, the focus cues could be selected from the group of detected corners, valves or joints in piping installations, detected equipment components subject to high rates of failure, or in some cases it might even be desirable to place physical framing elements within the actual physical installation at the monitoring location which would be recognizable by the function—for example colored frames or colored markings which could define areas where it was desired to establish an interest region with respect to the monitoring location. Any type of a detectable focus cue which would identify interest regions where focused visual inspection might be required will be understood to those skilled in the art to be within the scope of the present invention, including:
   a. detected interfaces between equipment and the environment;
   b. detected interfaces between components of equipment;
   c. elements of the surrounding environment;
   d. detected equipment which has a purpose related to leak containment, mitigation, fluid presence or tank levels; or
   e. physical framing elements positioned in the view of the corresponding cameras.

The contextualization step in respect of a particular monitoring location and camera view as outlined in the most broad embodiments of the method of the present invention involves the automated recognition of the interest regions in a particular camera view by the monitoring software component and the adaptive object-detection function. In other embodiments of the method of the present invention, the contextualization step might further comprise, following the determination and mapping of the interest regions, displaying the extracted image to a user via a human interface device along with an overlay of the location and dimensions of each determined interest region and an indicator of the detected focus cues associated therewith. Basically a user could be shown the image along with the computed shapes of the interest regions imposed thereon, and the user could then be permitted to validate or reject the detected focus cues and also could be permitted to validate, reject or modify the dimensions and locations of the interest regions determined and applied by the function, corresponding to the identified interest regions requiring particular monitoring or attention in the particular installation at the monitoring location.

If a user in the contextualization step validated or rejected any of the projected focus cues or validated, rejected or modified the dimensions and locations of the interest regions, the monitoring software component would adapt the object-detection function to enhance its level of accuracy and certainty in future contextualization and interest region rendering based upon the user interactions. Various embodiments of a user interface permitting this type of viewing and data interaction will be understood to those skilled in the art of user interface design and all such approaches are contemplated within the scope the present invention.

The contextualization step could be conducted in respect of only the first image data transmission received from an endpoint device in respect of a monitoring location—particularly where the camera or cameras attached to the endpoint device were in fixed positions and not moved, additional contextualization steps may not be required. In other embodiments, that contextualization step could be conducted periodically either based on a frequency of the number of image data transmissions received, based on time, based on an indication that one or more of the cameras attached to the associated endpoint device had been moved or the like. In further embodiments the contextualization step could be undertaken in respect of each image data transmission received from a endpoint device in respectable monitoring location, as the first step in the process of conducting the further review to identify the presence of any failure conditions in the images and calculated in that transmission.

Various failure attributes within an interest region which are used to determine the existence of a failure condition could include:
   f. color contrast in the image;
   g. colors within the image;
   h. textures within the image;
   i. relative position of detected edges in the image;
   j. relative orientation and angle of edges or contrasting regions in the image; or
   k. identification of data patterns correlating to failure conditions.

Any number of different failure attributes will be understood to those skilled in the art of adaptive object-detection function design and are all contemplated within the scope of the present invention.

In further embodiments of the method of the present invention the endpoint device might have at least one operating sensor connected to the capture bus and operative to read operating parameters of the equipment located at the monitoring location or to monitor other environmental parameters at the location. In such a case, the image data transmissions to the server from the related endpoint device would include the operating parameter values of the at least one operating sensor.

Where the image data transmissions to the server include parameter values of the at least one operating sensor, the adaptive object-detection function could use the operating parameters contained in the transmission to enhance the detection of failure conditions within the interest regions of the images encapsulated within the image data transmission. In such cases where the image data transmissions include sensor values, the monitoring software component could also adapt the function using the operating parameters contained in those transmissions in respect of the particular image in which failure conditions are detected, to enhance the level of accuracy and certainty in future adaptive object-detections and failure condition reporting.

The endpoint client software on a endpoint client hardware device could trigger the generation of an image data transmission to the server based upon at least one operating parameter value of a connected sensor, or in other cases with or without connected sensors on the capture bus the endpoint device could also originate data transmissions to the server on a time-based frequency or any number of other periodic update formats.

The digital cameras connected to the endpoint devices could be from the group of:
   a. regular image cameras;
   b. cameras capable of receiving any spectrum of light and generating an image output;
   c. infrared cameras; and
   d. cameras capable of gas detection.

There may be certain places in which more than one camera of more than one type is used to view the same monitoring location—for example a regular image camera and a thermal image camera or some such combination can be used to provide a higher level of certainty or assurance in the determination of the existence of potential failure conditions at a monitoring location. Any type and combination of cameras at any particular endpoint and any particular monitoring location will be understood to be within the intended scope of the present invention.

Images captured from the at least one digital camera could be still images, which would be ideal in the case of remote monitoring applications where less data bandwidth was easily available or was not cost-effectively available, or in other cases, the images captured from the at least one digital camera could be video images—in circumstances where higher amounts of available bandwidth were present. It will be understood that the necessary modifications to be made to the remainder of the steps of the method of the present invention to accommodate the processing of parsed image files of either still or video images and both such approaches are contemplated within the scope of the present invention.

The present invention also comprises a system for remote visual facilities inspection and failure detection at a plurality of monitoring locations. The system comprises an endpoint device at each monitoring location, each endpoint device having a capture bus capable of receiving image data from at least one connected digital camera, at least one digital camera positioned with a view and capable of capturing images of the corresponding monitoring location and connected to the capture bus, a network interface by which the endpoint device can transmit image data corresponding to images captured by the at least one camera to a remote server, and endpoint client software capable of facilitating the captured images from the at least one camera, conversion of captured images to image data and the construction and transmission of image data transmissions corresponding to a particular point in time image capture from the and at least one camera attached thereto to a remote server. In addition to the endpoint devices at each monitoring location, the system also comprises a server having a processor and memory, and external network interface capable of receiving image data transmissions from endpoint devices by at least one network, at least one human interface device operatively connected thereto for the display of imagery and monitoring results to the user and facilitating interactions with the server, and the monitoring software component comprising the necessary processor instructions to facilitate conduct of the method via the server. The monitoring software component includes an adaptive object-detection function.

The system will facilitate the method as outlined above, by periodically executing an image capture step at each endpoint device. The periodic image capture step comprises capturing an image from each digital camera connected to the capture bus of the endpoint device associated with the location, processing image data corresponding to each captured image into a data packet for transmission to the server as an image data transmission, and transmitting the image data transmission to the server via the network.

The monitoring software component will conduct at least one contextualization step in respect of each camera view of the monitoring location by first receiving or selecting an extracted image from the completion of an image extraction step by the server, and applying the adaptive object-detection function thereto to identify any focused cues signifying high-probability failure areas within the image. Using each identified focus cue, the software will then calculate a desired dimension and location of an interest region in respect of the extracted image, encompassing the signified interest region to be monitored. The dimensions and location of each determined interest region will be stored in respect of the corresponding camera view which is now a contextualized camera view.

Following the contextualization of each camera view with respect to a monitoring location, a monitoring loop is conducted using the server and the monitoring software component to detect the presence of failure conditions requiring human inspection in the particular monitoring location. This is done by, on completion of an extraction step in respect of a received image data transmission at the server pertaining to a contextualized camera view, firstly selecting the extracted image captured in respect of the contextualized camera view for analysis. The stored dimensions and location of each interest region for the contextualized camera view are then retrieved from the memory of the server. The monitoring software component will apply the adaptive object-detection function to at least the portions of the extracted image corresponding to the stored dimensions and location of each interest region for the camera view corresponding to the extracted image, to detect the presence of any failure attributes therein which indicate the existence of the failure condition.

If any failure attributes indicating failure condition are detected, a notification step would be executed in respect of the interest region by generating a graphic display via a human interface device in communication with the remainder of the server which displays at least the portion of the extracted image corresponding to the interest region containing the detected failure condition, along with an indication of the failure attributes identified by the function yielding the determination of the existence of the failure condition. The user would be permitted to validate or reject the detected failure conditions detected by the function, via the human interface device and any user validation rejection interactions with the server would be saved to the memory thereof. Following the completion of the notification step, the monitoring software component would adapt the function based upon the user validation rejection interactions stored, to enhance the level of accuracy and certainty of the function in future object-detections.

As outlined above with respect to the method and various embodiments of the system of the present invention the at least one human interface device could comprise a monitor and keyboard or other type of human interface device directly attached to the server, or in other embodiments particularly where there is more than one monitoring location potentially responsible for more than one user, the number of human interface devices could be more than one and at least one of those human interface devices could comprise the human interface of a remote client device operatively connected to the server by the network.

In the system of the present invention, certain endpoint devices might include at least one local sensor or data stream attached to the capture bus of the endpoint device providing at least one sensor reading or environmental parameter in the location of the endpoint device for the purpose of enhancing the certainty or accuracy of adaptive object-detection suggestions made by the monitoring software component. It will be understood that where there is at least one sensor attached to the capture bus of an endpoint device the sensor data captured and transmitted to the server along with the remainder of the image data transmissions could also be used, similar to user interaction data, to adapt and refine the accuracy of the image processing and adaptive object-detection function.

In addition to the overall system of the present invention, any server of the present invention or system, as disclosed, will also be understood to be within the scope hereof.

DESCRIPTION OF THE DRAWINGS

The invention will now be described in further detail in reference to the following Figures, which describe embodiments of the system and method of the present invention as follows.

DETAILED DESCRIPTION OF ILLUSTRATED EMBODIMENTS

Figure 1:
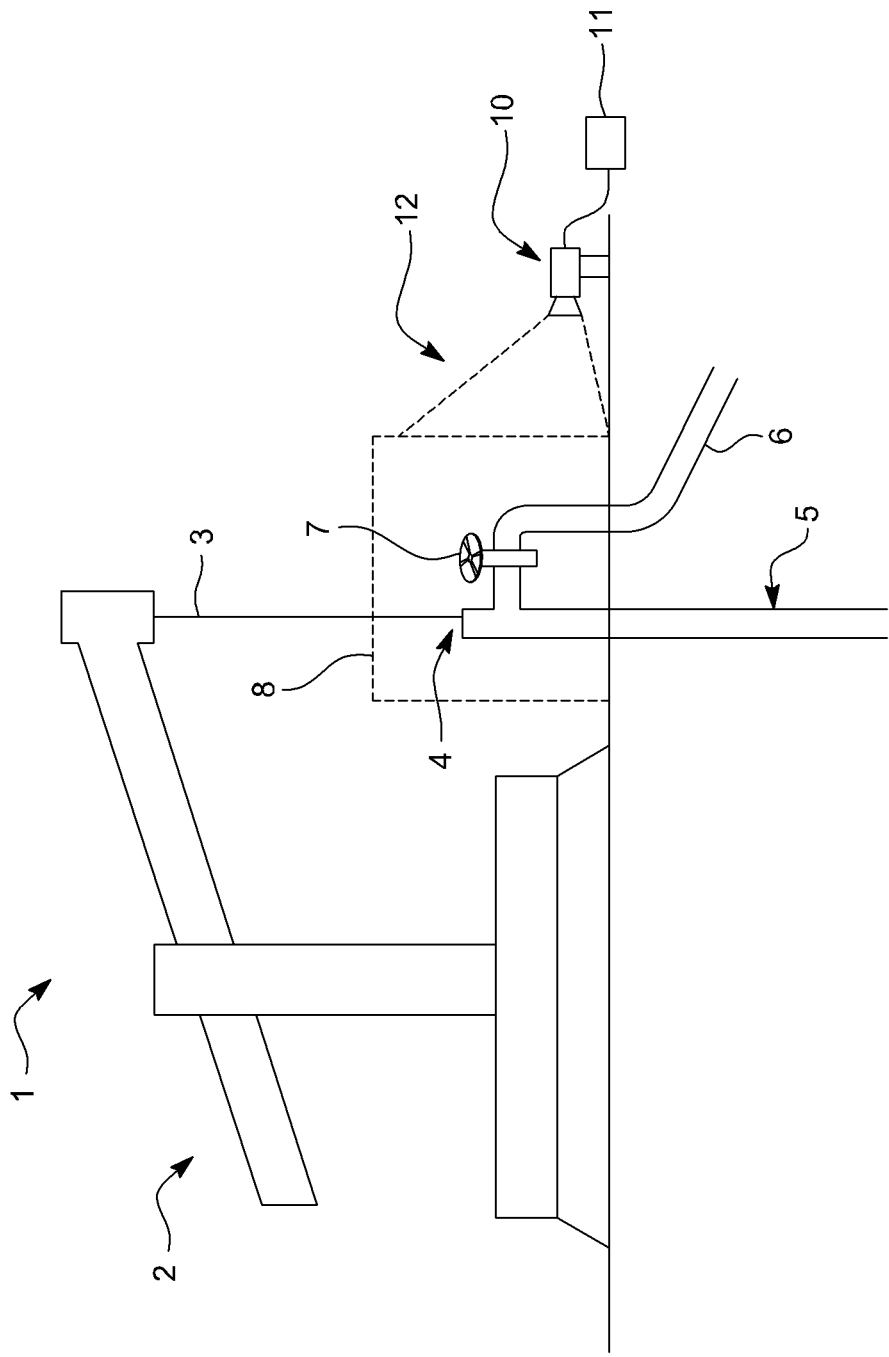
FIG. 1 is a schematic diagram showing a sample of a monitoring location equipped for monitoring in accordance with the method of the present invention.

As outlined, the system and method of the present invention pertains to the provision of an automated method of remote visual inspection and failure detection at a plurality of monitoring locations using a central server, and a monitoring software component which includes an adaptive object-detection function to identify areas of interest and potential failure attributes indicating potential failure conditions at the monitoring locations. For the purpose of outlining the operation and intended scope of the invention in further detail, we first provide some further context around some of the underlying concepts of the present invention, followed by a detailed description of the system and method.

Monitoring Locations

One of the terms which is intended to be understood and required is that of a monitoring location. A monitoring location is any location at which it is desired to implement the remote monitoring system and method of the present invention, using a wirelessly connected monitoring system. It is specifically contemplated that the system and method of the present invention will be particularly applicable in oilfield and petrochemical production facilities and extraction facilities, for the monitoring of areas around wellheads, tanks, valves, pipelines and pipes etc. Any type of an industrial location requiring periodic visual inspection to detect evidence of retrospective leaks or failures or potential prospective leaks or failures of components will be understood to be within the scope of the intended types of monitoring locations at which the system and method of the present invention could be deployed.

Specific areas in respect of which it is desired to conduct monitoring for contamination include inside of an oilfield containment apparatus, around an oilfield wellhead, on oilfield piping and the like.

Monitoring locations are any type of a piping or commercial equipment installation within the general context of the disclosure outlined herein, wherein it has traditionally been the case that in person visual inspection has been conducted on a frequent or periodic basis to ensure that there are no indications of a failure or potential failure which might result in equipment damage, environmental damage or the like.

Interest Regions

At each type of a monitoring location within the scope of those intended to be enhanced by the use of the system and method of the present invention, such as petrochemical and industrial oilfield applications etc., there are particular interest regions which are the areas of primary focus in the conduct of a visual inspection. For example in the case of the piping installation, pipe joints, pipe valves and the like are the areas of the highest potential likelihood of failure and thus these are the areas that are primarily inspected in the conduct of the physical inspection of the installation at that particular type of a monitoring location.

In an oilfield extraction application, the piping and equipment around the wellhead is potentially one of the highest probability failure areas and so that is the area that is carefully physically inspected.

In oilfield and other industrial tanking applications tank ports, areas where piping joins to the tanks or other similar joints or seams are the areas of most likely failure, spillage or leakage. In certain cases an entire monitoring location might comprise a interest region, where it is desired to monitor for vapors or other gaseous leakage etc.—in these types of applications, environmental sensors at the monitoring location would be a beneficial added feature of the system.

Referring to further types of monitoring locations, any type of a monitoring location in which equipment, tanks, piping or the like is located within an environmental berm for environmental spill protection, the entire circumference and integrity of the berm might be a further interest region for monitoring.

Any type of an area that a educated human inspector would focus on in the physical inspection of a particular monitoring location to detect the potential for a failure condition or the existence of the failure condition would be a interest region and similar to those interest regions being the areas of key importance in terms of physical inspection at the monitoring location site by human inspectors, the same interest regions are the areas of primary interest from the perspective of an automated image-based monitoring system and method such as that disclosed herein.

Cameras and Camera Views

The present invention effectively consists of a server based monitoring method and system which will use an artificial intelligence based object-detection function to both identify and define interest regions for monitoring in the server-based method as well as to identify failure attributes of the use of those interest regions which would suggest the existence of the failure condition. As outlined throughout, various types of cameras could be used as well as various types of images, within the scope of the present invention.

Typical digital cameras, which are widely available and cheap to acquire, could be used in conjunction with an appropriate capture bus and endpoint device to capture standard regular photography of particular views of a monitoring location for the purpose of the practice the present invention. In other applications, thermal or infrared cameras or other types of cameras could also be used with attendant modifications to the monitoring software component and the remainder of the method of the present invention, without departing from the scope hereof.

The cameras which would be used would capture either still images or video imagery of the monitoring location. It is particularly contemplated that the method of the present invention would be practiced using still images, which would minimize the amount of network bandwidth consumption required to practice the method where the monitoring locations are in remote areas where bandwidth is limited in availability and high in cost. It will be understood that video files could be used also, up to the point of real time video being monitored in accordance with the remainder of the method of the present invention, in applications where bandwidth was more freely available i.e. where the server was locally installed at a particular monitoring location of the local network bandwidth was only required, or where cost and availability constrictions did not apply to the availability of bandwidth. Both such approaches are contemplated within the scope of the present invention.

Cameras could be fixed cameras or they could be also allowed to move to capture multiple views of a particular monitoring location. It is particularly contemplated that in the most efficient and lowest-cost embodiments of the method and equipment of the present invention, fixed cameras which are effectively mounted in a fixed location with a fixed view of an area of interest at a monitoring location primary type of a camera which would be used. In embodiments of the method of the present invention relying upon multiple views or multiple images being captured in a particular monitoring location, cameras that were able to move between locations or shift their view to capture multiple images could also be used and again would be understood to be contemplated scope of the present invention.

The concept of a camera view is a key element of the method of the present invention —a camera view effectively comprises a particular view of a monitoring location from a particular camera location. At a particular monitoring location there will be at least one optimal location and direction for the mounting and direction of a camera to capture images that have the necessary view of interest regions therein, for the purpose of the monitoring method of the present invention. In certain cases, where multiple cameras are used or even in the case of a movable camera a single camera could also be used, to capture several camera views. In a monitoring location with several camera views, the several camera views could be views of multiple areas of concern with multiple interest regions for monitoring, or in certain embodiments also several camera views of the same general area of the installation of the monitoring location could also be used to enhance the level of accuracy and certainty of the predictions made by the object-detection function. The camera view effectively the view of the monitoring location which will be captured on an ongoing basis by a camera from a particular location. Since the camera view from a fixed camera would always be the same, it simplifies the process of identification and monitoring of the contents of interest regions at the location, since theoretically the same areas of each image captured with a fixed camera view are the areas which would be monitored to identify the failure attributes and failure conditions.

Object-Detection Function

The key aspect of the software of the monitoring system of the present invention is an adaptable object-detection function, capable of the conduct of object-detection in images captured at one or more monitoring locations. The concept of object-detection technology will be understood to those skilled in the art—however, until the present time object-detection of failure attributes such as spills or the like has not been possible or has not been an area explored in the prior art, since it requires the application of significant learning and data to the function to provide a high level of certainty in spill predictions.

The object-detection function of the present invention will be used to identify equipment attributes or location attributes which comprise focus cues identifying interest regions for monitoring. By training the object-detection function to identify focus cues which indicate interest regions, the need for highly trained operators of the system at the time of the setup and configuration of particular monitoring locations is minimized, particularly as the function becomes more and more accurate over time in identifying such focus cues. Similarly, the object-detection function is capable of identifying failure attributes which indicate a failure of some type at the monitoring location—for example a spill, a fire, or even potentially of valve left in the wrong position by a maintenance crew or the like. Any such failure attributes indicating a potential for a failure or less than optimal operation at a particular monitoring location are failure attributes indicative of failure condition which the object-detection function present invention should be able to detect.

As will be detailed in further sections below, one of the key aspects of the object-detection function of the present invention is that it is contemplated to be adaptive that is to say that it will learn as object-detections indicative of focus cues or failure attributes are made in respect of captured images. Each time that a particular type of an object indicating a focus cue or an failure attributes is recognized and used in the monitoring method, displayed to a user for acceptance or rejection, the acceptance or rejection of those recognitions and detections can be used to fine-tune the behavior of the function in future object-detection passes. If a user is given the ability to accept or reject particular detections by the user interface of the human interface device and they do not override the recommendation or detection of any such objects, that positive indication of the accuracy of record will also be for this purpose. The monitoring software component of the present invention will, as outlined in further detail herein, be capable of storing the necessary information with respect to each object-detection conducted by the function and have the necessary programming to allow for re-rendering, fine-tuning or otherwise enhancing the mathematical model underlying the function based upon each set of data points to provide a higher level of accuracy and certainty.

In certain embodiments of the method of the present invention, the system might be modified to indicate on the graphic display to a user, either in terms of focus cues defining or indicating a interest region or failure attributes indicative of a failure condition, an indicator of the probability of accuracy of the function based upon past recognitions and the mathematical model—as the probability of accuracy of particular recognitions and detections increases, the graphic display to users of same can be altered and the behavior of the monitoring software component and the remainder of the method could also be enhanced.

In terms of the processing of image data the images, be they photographs or video, would be compared against one or more artificial intelligence or image processing data models for object detection, classification and texture recognition. It will be understood that a high number of different types of image processing algorithms or intelligence models could be created for use in accordance with the method of the present invention—to recognize particular types of objects or textures in images based upon the quality and format of the images as well as the type of anomalies it was desired to detect. Any type of an image processing algorithm or mathematical function capable of detecting particular objects or textures or other items in images which could identify safety failure anomaly such as those desired to be identified in accordance with the remainderthe myth of the present invention are all contemplated within the scope hereof.

Focus Cues

As outlined in further detail throughout, focus cues within an image captured of a particular camera view are contemplated to be particular objects or items which can be recognized in an image at a particular monitoring location which might be indicative of the existence and location and size of a interest region at the monitoring location and in the captured image for further monitoring. For example, the presence of a valve or particular piping configuration, the presence of an environmental berm which needs to be monitored for breaches and spillage, tank flanges and the like, and any number of different types of equipment or indicators in a particular image can be used to identify, based on programmed understanding of particular types of monitoring locations, the interest regions that need to be monitored in accordance with the method of the present invention for the purpose of most quickly identifying the potential existence of failure conditions.

It will be understood that the types of focus cues that might indicate the presence of a interest region will vary based upon the type, size and location of the monitoring location in question and that any type of a focus cue being an aspect of an image which can be detected by the object-detection function and understood by the function and the remainder of the monitoring software component to indicate the existence of a interest region are all contemplated within the scope hereof.

Object-detection functions can identify the presence of particular shapes or objects in an image. Specifically then, the system can be programmed in respect of particular types of industrial installations to recognize particular types of objects which would indicate the presence of a interest region—valves, connections, seals and the like. Once the system is pre-populated with some general guidelines in the function as to the types of items to be recognized, as more object-detections are conducted and ratified or rejected, the adaptation of the function to incorporate the accuracy and certainty of those previous object-detections can enhance the functionality of the system. The system might include, if necessary or desirable for the administration and operation of the function database of focus cue information in respect of different types of industrial installations, which would provide the basic data set for use by the monitoring software component to identify focus cues in extracted images. The contents of that database along with extracted identified image information etc. for identified and ratified focus cues can be used by the function and the monitoring software component in subsequent object-detection operations to enhance the accuracy and the breadth of recognition possible with the function and the monitoring software component.

As the system and method of the present invention is executed, and object-detections and recognitions are made which result in the calculation of location and size of particular interest regions in respect of camera views of cameras connected to the system, the type and nature of the focus cues can also be used to add to and enhance the behavior of the adaptive object-detection function and provide a higher level of certainty and accuracy in the selection and creation of interest regions in respect of particular camera views for adoption or modification by the user.

Dependent upon the type of a user interface provided, when particular focus cues used in the calculation and location of particular interest regions in the camera view image are displayed to a user, the system could also allow the user to elements of the image which were not predicted by the function to be a focus cue in respect of the particular type of installation at the monitoring location, and the manual selection of additional focus cues by the user could be used to further enhance the recognition model of the function and heighten the level of accuracy and certainty in future recognitions.

More than one focus cue could be used to identify the existence and position of a single interest region in a camera view, or individual focus cues detected in a single camera view might also indicate the presence of multiple interest regions for monitoring. Again, the adaptation of the object-detection function based upon recognitions and user interactions will maximize the likelihood of success in the determination of the existence of interest regions and the definition of interest regions related thereto. Any type of an object or image characteristic capable of indicating the existence of a interest region could be a focus cue as contemplated by scope and intention of the present application.

It is also specifically contemplated that the user interface provided to a user in certain embodiments of the system and method of the present invention can permit a user to manually identify a focus cue in a particular type of an image to allow for enhancing the scope of the types of focus cues be recognized by a particular embodiment of the monitoring software component. For example, user in reviewing a graphic display of a particular extracted image and the identified focus cues identified by the system could, in the appropriate rendering of the software in the system, be allowed to manually select additional items within the view, that were not known to the system to be a focus cue, and subsequent adaptations and iterations of the function would then begin to recognize and learn that type of an object as well.

Interest Regions

The interest regions in a particular camera view of the monitoring Haitian would be the areas most likely to experience a failure or detection event that is desired to be captured. The interest regions in a particular image would be sized and located by the monitoring software component of the present invention based upon the presence of one or more focus cues in the image. The specific types of focus cues which could be recognized by the object detection function of the present invention to signify the presence of an interest region would be selected from the group of:

e. detected interfaces between equipment and the environment;
f. detected interfaces between components of equipment;
g. elements of the surrounding environment;
h. detected equipment which has a purpose related to leak containment, mitigation, fluid presence or tank levels; or
i. physical framing elements positioned in the view of the corresponding cameras.

Based upon the detection of any of these types of focus cues, the software of the present invention could determine the existence of an interest region to be visibly monitored in accordance with the remainder of the method.

Failure Conditions

A failure condition is any type of a condition at a monitoring location which would require inspection, either remotely by human, or in person by attendance at the monitoring location. The concept of the system and method of the present invention is to detect, within the interest regions of a camera view, the existence of one or more failure conditions and which require a follow-up human inspection. Any type of a condition and monitoring location, which will vary depend upon the types of locations and equipment, which would require human overview would be within the scope of failure conditions as outlined herein. Failure conditions, as the terminology is chosen, are indicative of any condition requiring further inspection including actual conditions which could be suggestive of all of equipment failure through to conditions simply requiring inspection to maximize or enhance safety or efficiency of operation and the like. The scope of the context intended for this term will be understood to those skilled in the art of facilities monitoring and instrumentation in this field and any type of falls within this general category is intended to be within the scope of failure conditions meant to be detected by the system and method of the present invention.

In a prior art context, many types of failure conditions can be detected by visual inspection and it is the substitution of the system and method of the present invention for a prior art human visual inspection methodology, leading to the detection of these types of failure conditions, which is contemplated. Basically upon a human inspection and inspector will be able to notice certain visual attributes of the equipment at a monitor location which will be indicative of the existence of the failure condition. The visual attributes of the equipment which are indicative of the existence of the failure condition are the failure attributes which are desired be captured and identified by the object-detection function of the software to present invention, as a first category or first line of monitoring in advance of the need for an in person or remote human inspection.

Similar to the focus cues, attributes suggestive of failure conditions could be anything from the detection of a spill on the ground surface within a particular interest region, the presence of condensation or the like on a particular surface etc. through to a breach of an environmental berm or the like resulting in a spill. It is also specifically contemplated that failure attributes suggesting failure conditions could even include visibly detectable equipment settings that were not otherwise instrumented—for example failure attributes could include the identification of the position of a particular valve in an open or closed position following a maintenance operation or the like, which could also be used to indicate a potential for failure, accident, or less than optimal performance.

Attributes of extracted images which might signify the presence of a failure condition include the following:
a. color contrast in the image;
b. colors within the image;
c. textures within the image;
d. relative position of detected edges in the image;
e. relative orientation and angle of edges or contrasting regions in the image; or
f. identification of data patterns correlating to failure conditions.

Figure 7:
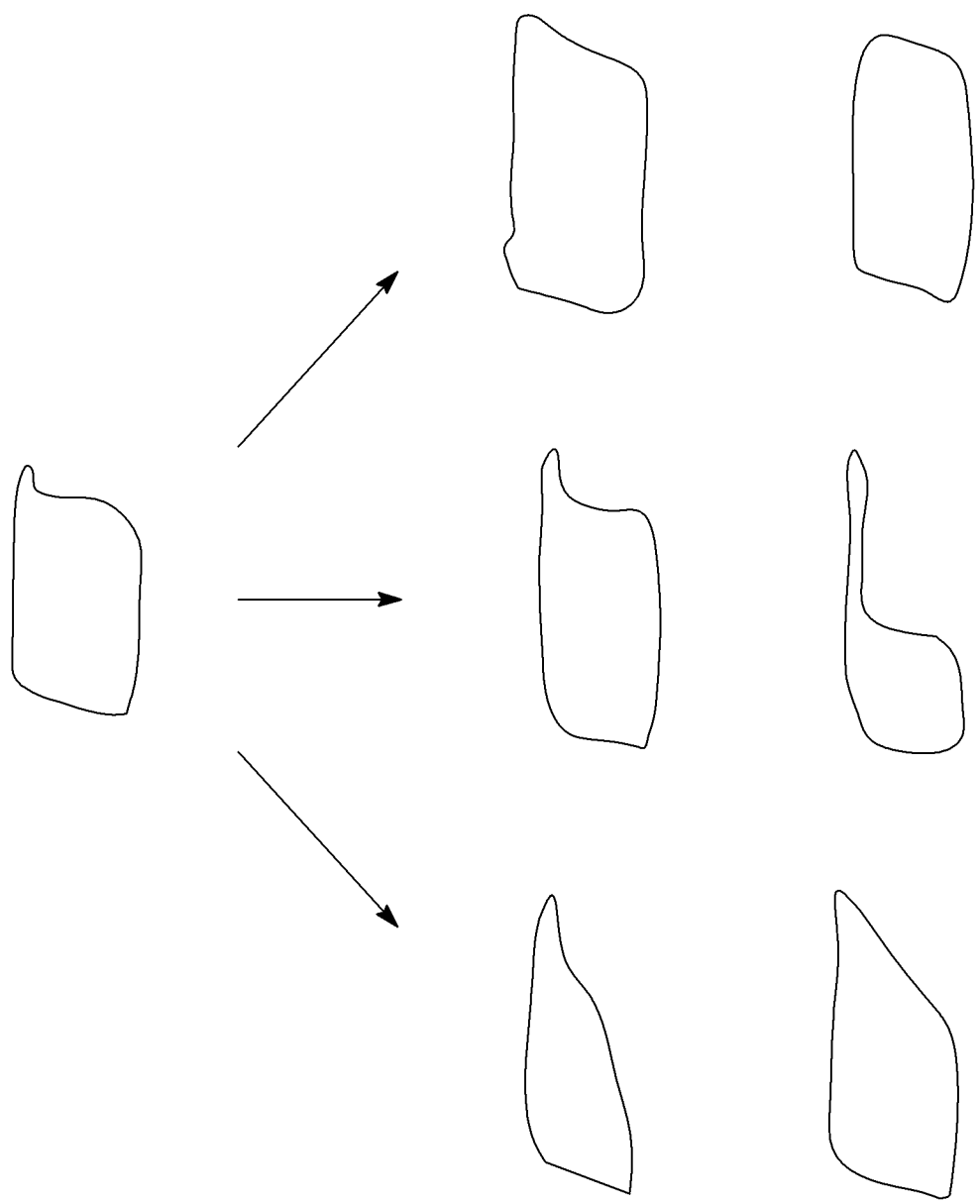
FIG. 7 demonstrates a sample of a plurality of different shape recognitions which might be made by the object detection function in computation of the existence of failure conditions in an extracted image.

FIG. 7 shows a sample of a series of shapes demonstrating the behaviour of a sample of an object detection function—which might be used to compare items appearing in images to detect the presence of a particular type of coloured object or texture indicating an anomaly requiring further inspection.

Based upon the application of these prediction models to the images, if an anomaly was detected, and anomaly notification could be presented to a user via the interface of the user device for further review. It will be understood specifically that the image detection and prediction algorithms which are used could be programmed in such a way that they could learn and refine their detection abilities based upon user feedback received to anomalies detected.

System Overview

Referring to FIG. 1 there is shown a schematic drawing of one example of a monitoring location which is instrumented for monitoring in accordance with the method of the present invention, as well as the related embodiment of a system in accordance with the present invention. There is shown a sample of a monitoring location which is, demonstratively, a remote pumping and extraction facility oilfield, with a pump jack extracting oil from a well using a vertically reciprocating pump, into a pipe and towards a tank etc. The monitoring location 1 as shown, includes the vertically reciprocating pump jack 2 which is operatively connected to a pumping shaft 3 extending through a packing and fittings 4 at the wellhead of a downhole tubular 5. A take away conduit 6 is a pipe through which the extracted oil is pumped into local or remote storage. The take away conduit 6 includes a valve 7.

Generally speaking, in a traditional sense where physical inspection was taking place at this monitoring location 1, human inspectors would inspect the area around the wellhead fittings 4, and the joint of the wellhead tubular 5 to the take away conduit 6, as the area most likely to exhibit a failure, or leak or the like. In the context and terminology of the present invention this area, generally shown within rectangle 8 is the interest region to be monitored.

There is shown a digital camera 10 connected to an endpoint device 11. The digital camera 10 which is shown is in a fixed position with the camera view 12 towards the rectangle 8. The endpoint device 11 includes a wireless network interface to a network by which the endpoint device 11 can communicate with a server.

Figure 2:
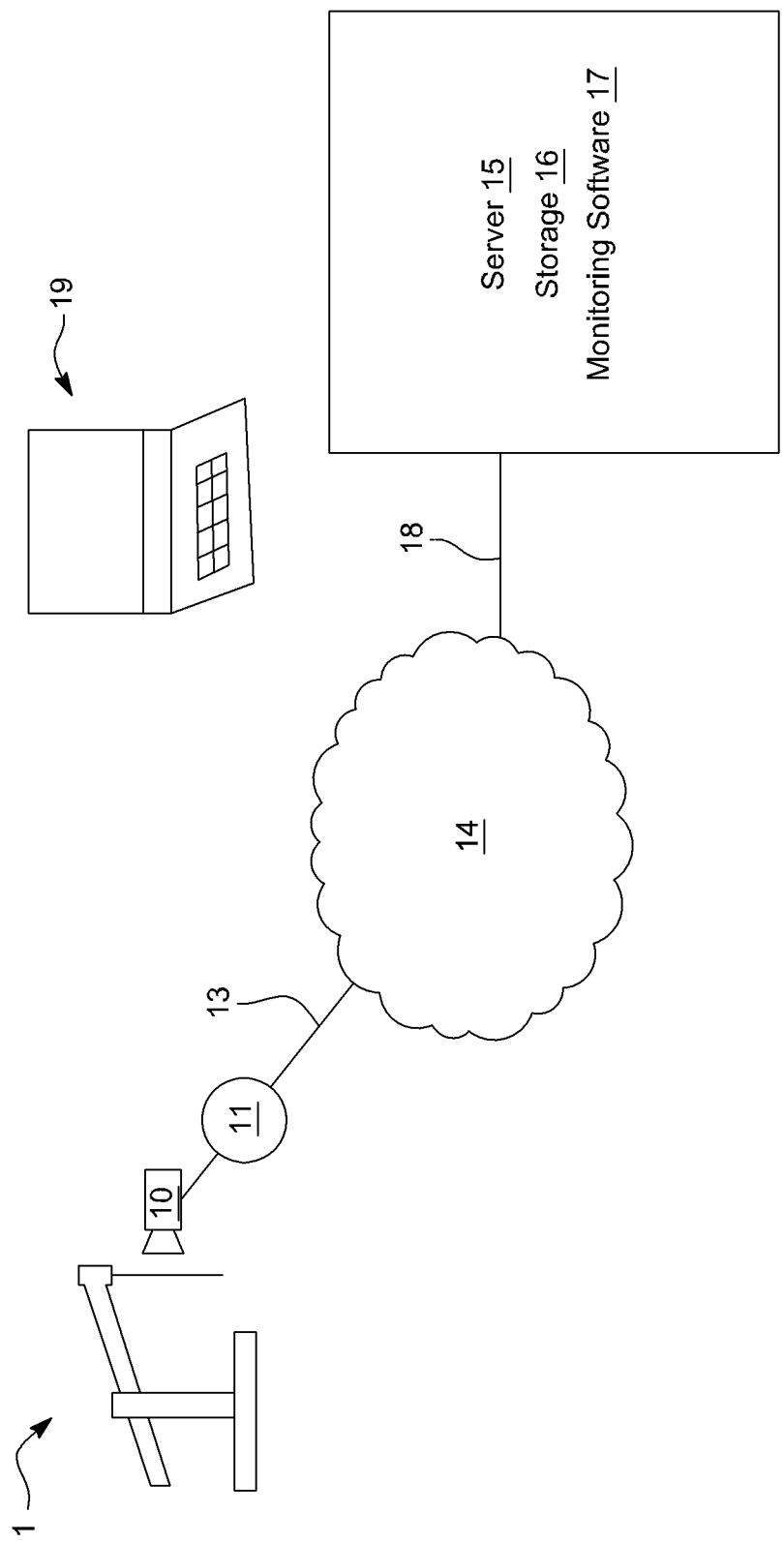
FIG. 2 is a schematic diagram showing an embodiment of the complete system of the invention for use at the monitoring location of FIG. 1.

Referring to FIG. 2 there is shown the remainder of an embodiment of a system in accordance with the present invention, and a single monitoring location 1 as shown in Figure the single monitoring location 1 again shows the endpoint device 11 with a single digital camera 10 attached thereto, and having a network interface 13 connected to a network 14 which allows communication with the server 15. The server 15 includes a network interface number 18 as well. Also shown attached to the server 15 is a human interface device from 19 which in this case is a locally connected monitor and keyboard.

Key components of the server 15 include memory or storage 16 which would hold the processor instructions comprising the monitoring software component 17 as well as whatever other data and processor instructions were required to be stored for operation of the server 15, adaptation of the function within the monitoring software component 17 as well as any short-term or long-term storage of the results of object-detections conducted by the monitoring software component 17 for the purposes of the subsequent adaptation of the function to enhance its accuracy.

Figure 4:
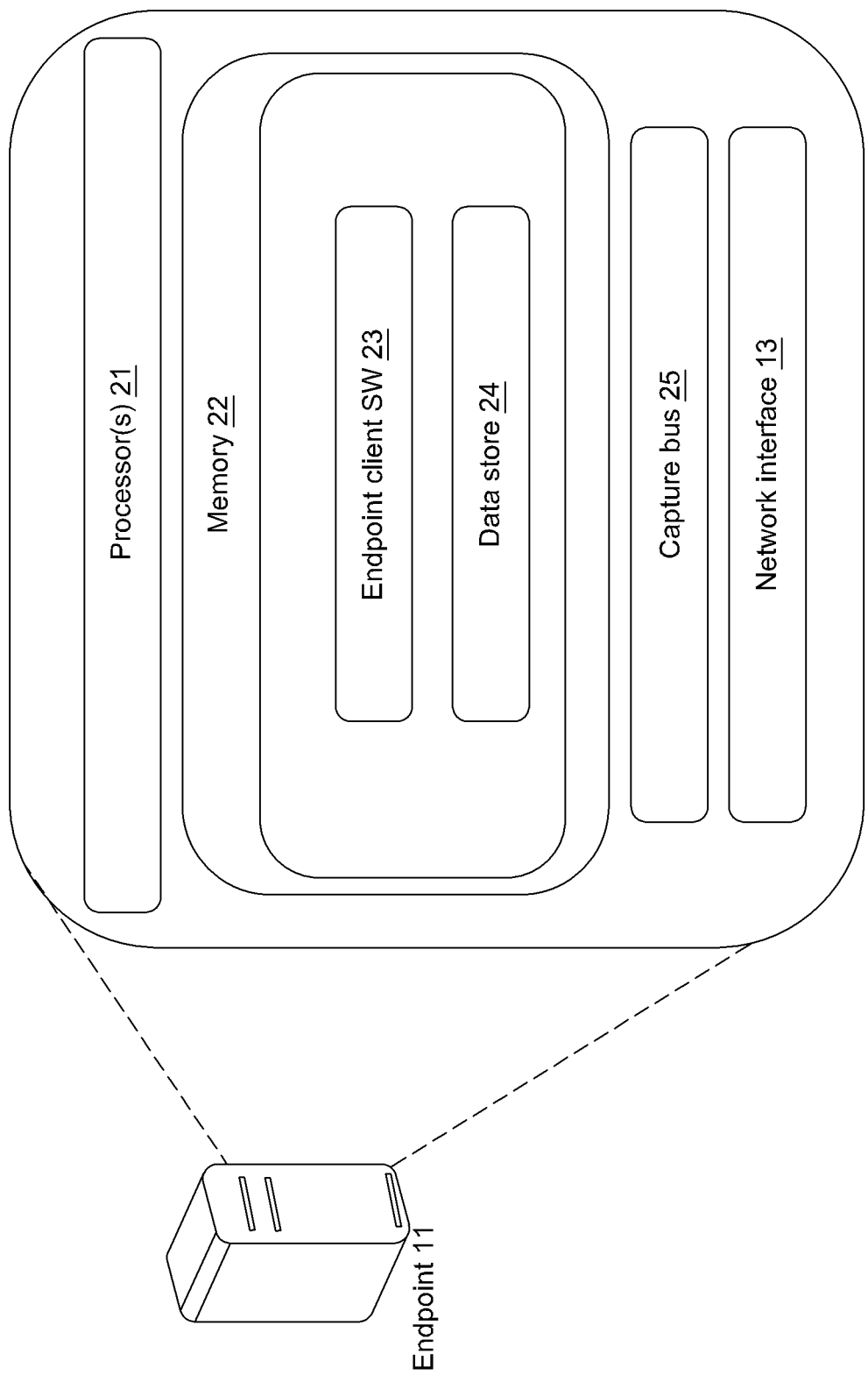
FIG. 4 is a block diagram demonstrating the components of the sample embodiment of an endpoint device in accordance with the present invention.

The endpoint device 11 is also shown in embodiments of FIGS. 1 and 2. A sample schematic diagram showing the different typical components of an endpoint device in accordance with the present invention is shown in FIG. 4.

Figure 5:
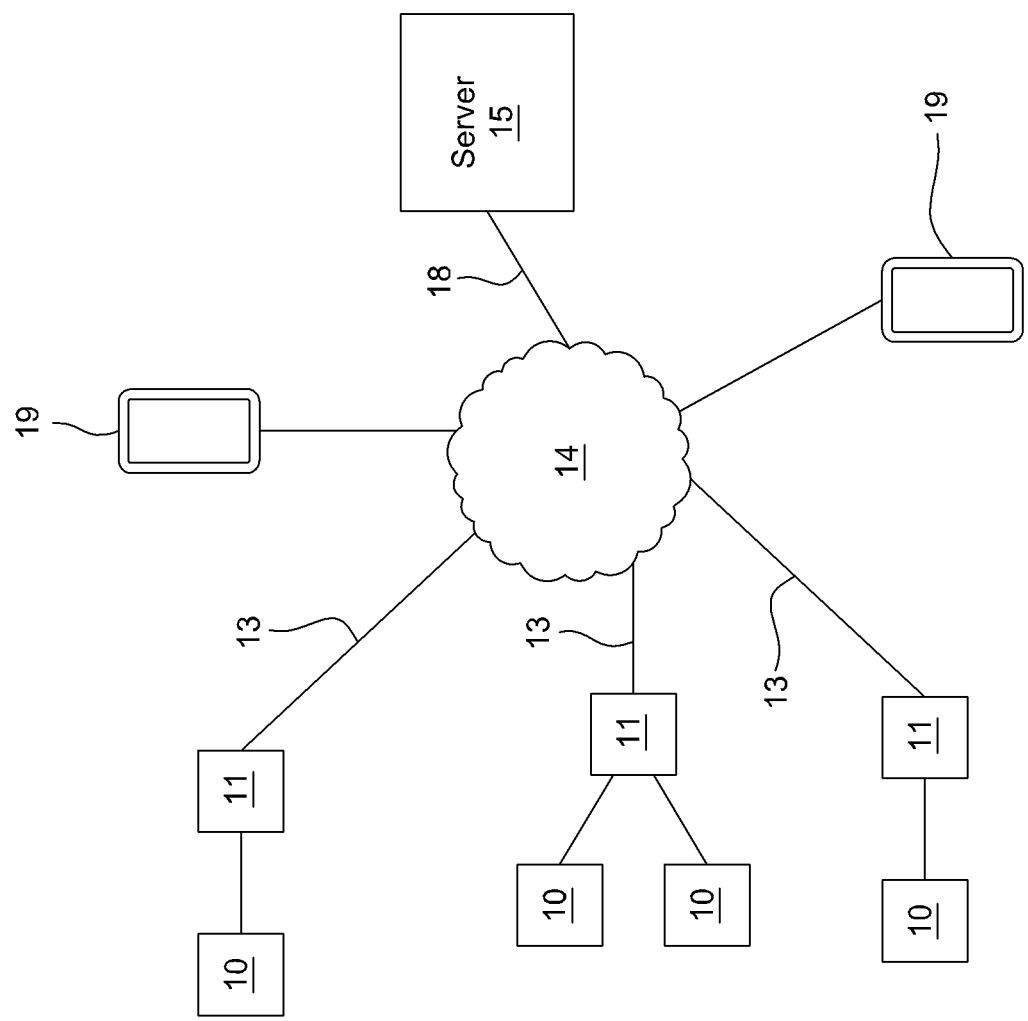
FIG. 5 is a schematic diagram showing one embodiment of a system in accordance with the present invention, with a plurality of monitoring locations and a plurality of human interface devices.

FIG. 5 demonstrates an alternate embodiment of the system in accordance with the present invention, intended to demonstrate the preferred service bureau approach to the offering of the system and method of the present invention there is shown a plurality of monitoring locations 1, each of which is instrumented with an endpoint device 11 and at least one digital camera 10. The second monitoring location 1 include two cameras 10, to demonstrate possibilities of multiple cameras 10 in a single monitoring location 1.

Each of the three endpoint devices 11 shown connected via the network 14 to the server 15, using their network interfaces 13.

For the purpose of demonstrating the use of multiple human interface devices 19, are shown in this Figure are remote client devices also operatively connected to the server 15 by the network 14. Two human interface devices 19 comprising remote client devices are shown—in each case, a smart phone is shown as the remote client device although as will be understood any number of other different types of hardware devices capable of communicating with the server 15 and providing the necessary interaction and visual display to a user to facilitate the operation of the method of the present invention will be understood to be contemplated within the scope hereof.

Figure 6:
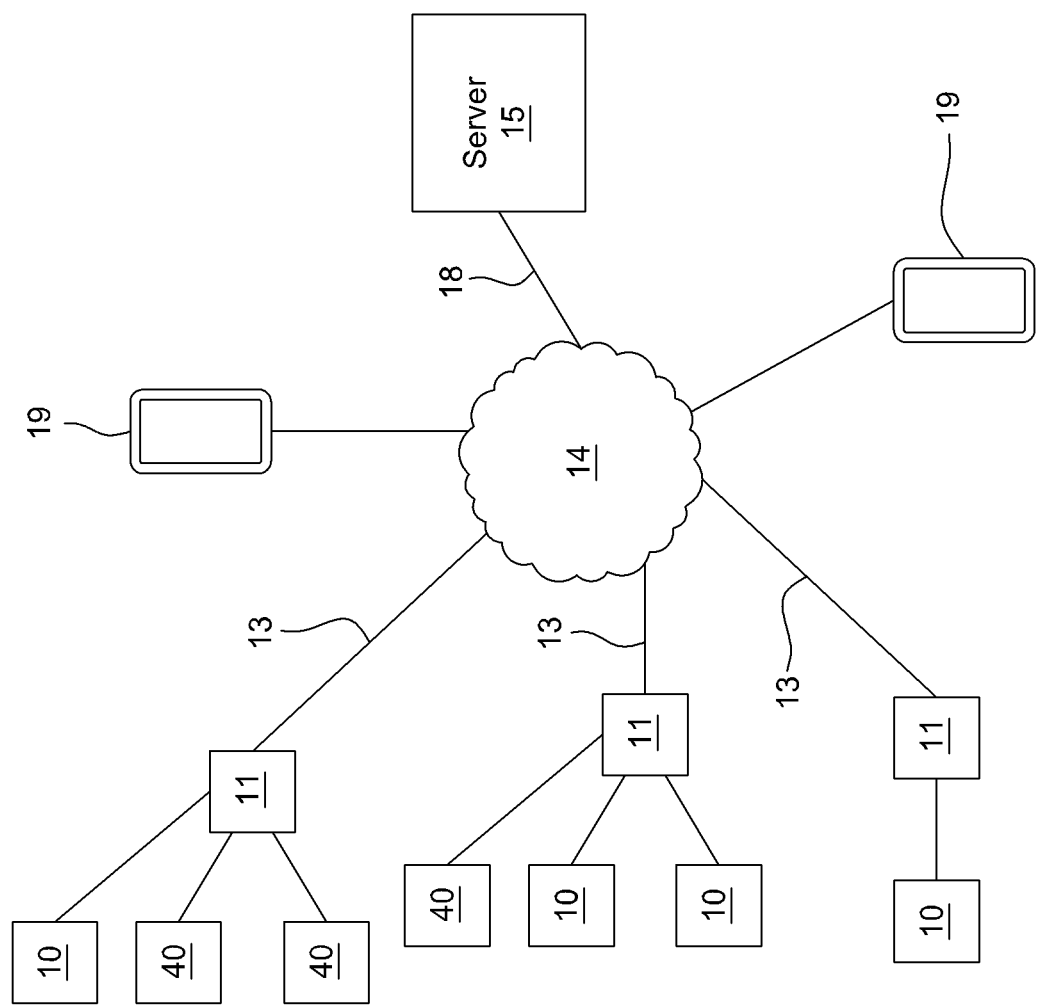
FIG. 6 is a schematic diagram of the system of FIG. 5, adding sensors to the capture bus at several of the monitoring locations.

A further alternate embodiment of the system of the present invention is shown in FIG. 6. The system embodiment of FIG. 6 is the same as that of FIG. 5, namely showing multiple monitoring locations 1 and multiple human interface devices 19, with the addition of at least one sensor 40 connected to the endpoint device 11 at two of the monitoring locations 1. As disclosed elsewhere and throughout, the use of at least one sensor 40 or the capture of an alternate data stream of operating or environmental parameters at the monitoring location 11 for incorporation into image data transmissions to the server 15 will provide additional information for use by the adaptive object-detection function and the remainder of the monitoring software component 17 to provide maximized accuracy and certainty in the prediction of the location of interest regions or the presence of failure attributes in particular captured images.

Having reviewed the system embodiments in basic detail we will now discuss certain components in additional detail before reviewing the specific contemplated embodiments outlined herein.

Server

Figure 3:
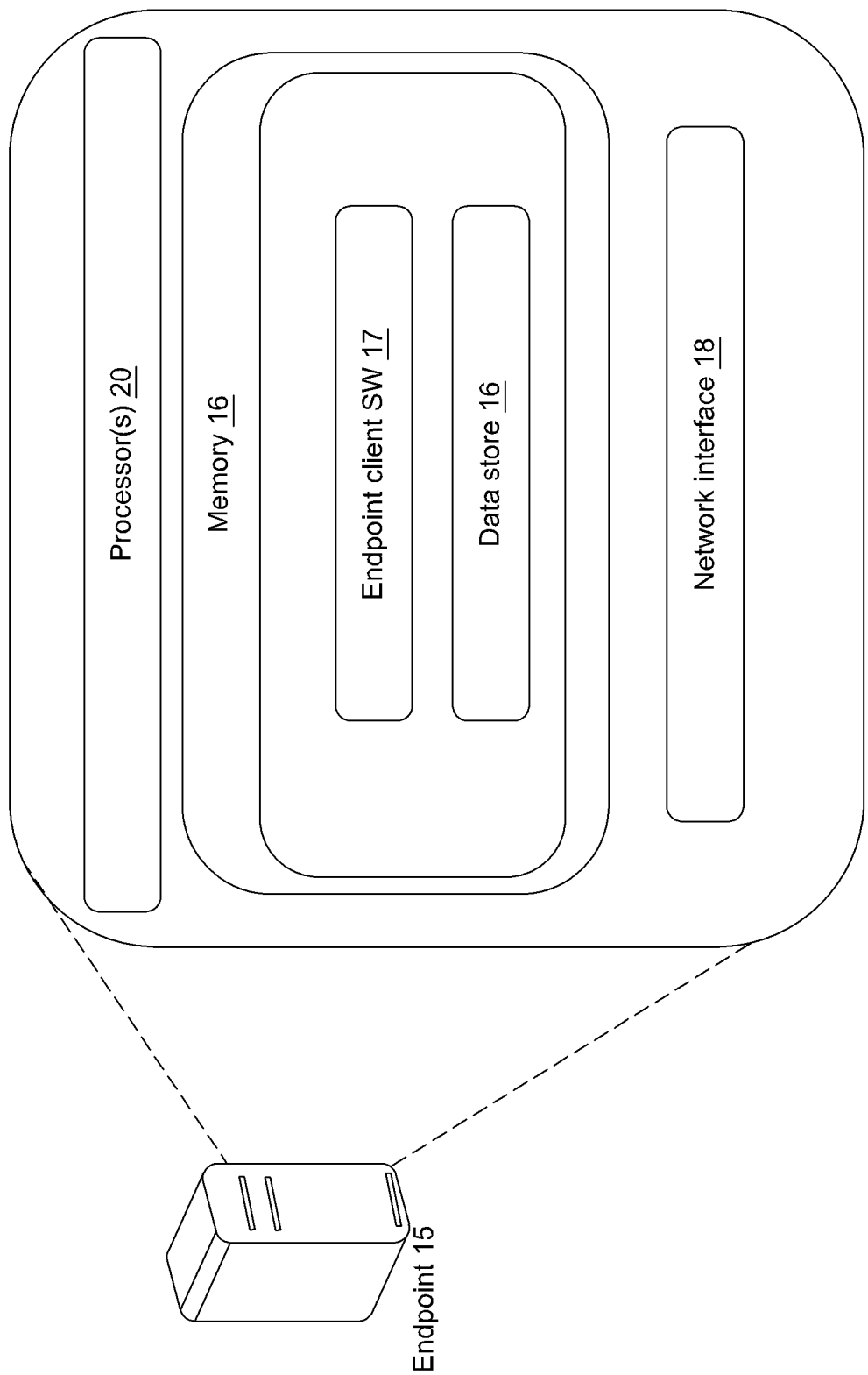
FIG. 3 is a block diagram demonstrating the components of a sample embodiment of a server in accordance with the present invention.

The server 15, sample embodiment which is demonstrated FIG. 3, might consist of one or more servers—a single server or server farm approach. Server 15 would comprise one or more processors 20, as well as memory the memory 16 might include various processor instructions for the method of the present invention or otherwise in operating the server processor instructions corresponding to the monitoring software component 17 are shown stored within the memory by machine-readable instructions which may include one or more instruction more of server firmware and operating systems, the monitoring software will 17 and/or other instruction components.

Memory 16 could also include a data store 30 for the storage of various information and data generated during the operation of the method were required for the operation of the method of the present invention.

Memory 16 might comprise non-transitory storage media that electronically stored nation. Electronic storage media and we 16 might include one or both of system storage provided integrally with the server 15 and or removal storage that is removably connected to the server via for example a port or a drive. Memory 16 might include one or more of optically readable storage media, magnetically we its, electrical charge based storage media, solid-state storage media or other electronically readable storage media. Memory 16 may include one or more virtual storage resources i.e. cloud storage, VPN storage of the memory 16 might store software function by the processors 20, information received from and/or other information that enables the server 15 to function as described this document.

The processor 20 might be provide information processing capabilities in the server 15 might include one or more of a digital processor, and analog processor, digital circuit design and process information and analog circuit designs designed to process information and/or other mechanisms for electronically processing information.

Besides the general operating system instructions, the server 15 would include rise and monitoring software will 17 responsible for execution of the process and method of the present invention and the server 15 and coordinating communication with endpoint devices 11 and or human interface devices 19. The monitoring software can 17 itself might act as the interface with the data store 30, or the server software interfaces to the data store 30

The monitoring software component 17 would comprise subroutines to administer the data stored 30, create, modify and process data transactions and record the data store 30 and any additional numerical transactions and mathematical operations in support of the adaptive object-detection function and the like.

The server 15 also includes at least one network interface 18 by which to communicate with the endpoint devices 11 and in some embodiments the human interface devices 19. The particular hardware and software requirements of the network interface of this nature will be understood to those skilled in the art of hardware design in any type of an interface capable of the necessary number of networks to facilitate these communications are all contemplated scope of the present invention.

Endpoint Device

The endpoint device 11, as demonstrated in the embodiment of FIG. 4 and otherwise, effectively comprises a hardware interface between at least one digital camera 10 positioned in respect of the monitoring location, and the server 50 via a network interface. The endpoint device 11 can PC or similar computing device capable of creation with the necessary additional hardware at a monitoring location 1 and both such approaches are contemplated within the scope of the present invention.

Referring momentarily specifically to the demonstrative elements of the endpoint device 11 shown in FIG. 4, the input device 11 includes a processor 21 and memory 22. Member 22 includes endpoint client software 23 required to facilitate interactions between the endpoint 11 and the server 15. Also shown is a data store 20 for additional information temporary image storage and the like could take place. Certain embodiments of the endpoint 11 may include or not include a specific separate data stored or and all such variations and modifications will be understood to be within the scope of the present.

Also shown is the capture bus 25, which is a communication bus of the endpoint 11 capable of connection to an communication with the at least one digital camera 10. In some embodiments of the endpoint device 11, the capture bus 25 is also capable one or more local sensors capable of capturing operating or environmental parameters or readings at the monitoring location 1, which can be used to enhance the predictions generated by the monitoring software component 17 in the prediction of failure conditions.

Finally shown in this Figure is a network interface 13 by which the endpoint device 11 can communicate via a network 14 with the server 15. The endpoint device 11 would include a power supply and other basic components of a computing device as would be required and understood to those skilled in the art.

Endpoint Client Software

The endpoint client software 23 will primarily be responsible for the facilitation of the method of the present invention from the endpoint device 11 end. Specifically, the endpoint client software 23 will be responsible for the periodic execution of the image capture step of the method of the present invention, wherein an image can be captured from at least one digital camera 10 connected to the capture bus 25 of the endpoint device 11, and the image data corresponding to each captured image can be then processed into a data packet for transmission to the server 15 as an image data transmission. A prepared image data packet representing an image data transmission can then be transmitted to the server 15 via the network 14.

In addition to actually capturing images from the digital cameras 10 connected to the endpoint device 11 by the capture bus 25, the endpoint client software 23 could also be programmed to include the necessary monitoring criteria or timing criteria to periodically trigger an image capture step.

In embodiments of the endpoint device 11 having at least one sensor 40 connected to the capture bus 25, the endpoint client software 23 would also process readings captured from the at least one sensor 40 at the time of the capture of images from the at least one digital camera 10, and packaging the sensor readings in addition to those images into the image data transmission for transmission to the server 15.

In embodiments of the system of the present invention where an endpoint device 11 had more than one digital camera 10 connected thereto, a particular image capture step executed by the endpoint client software 23 might always include the capture of images from all of the digital cameras 10 connected to the endpoint device 11 such that a particular image data transmission to the server 15 included multiple captured images for processing, or in other embodiments, the endpoint client software 23 might capture individual images from individual digital cameras 10 connected thereto and might send individual image data transmissions to the server 15 in respect of each captured image. Both such approaches are contemplated within the scope of the present invention.

In cases where the endpoint device 11 at least one sensor 40 connected to the capture bus 25, the endpoint client software 23 could also use the current readings or parameters from the sensors 40 to determine the need to trigger an image capture step and transmission to the server 15. Any number of modifications to the functionality of the endpoint client software 23 to provide some added flexibility and functionality to the capture method and the overall monitoring method of the present invention will be understood to be within the scope of the present invention.

Monitoring Software Component

The monitoring software component 17 operating server 15 is the key component necessary to practice the method of the present invention. The monitoring software component 17 comprises the necessary processor instructions to aid the processor 20 of the server 15 in the conduct of the various steps of the method of the present invention and specifically contains the adaptive object-detection function mentioned throughout which is used to identify focus cues and failure attributes within extracted images.

In operation, the monitoring software can capable of One of the key aspects of the monitoring software component of the system and server of the present invention is that the monitoring software component can adapt the object-detection function based upon previous positive or negative recognition results, user interactions and the like. By adapting the object-detection function over time, the ability of the function and the software and system of the present invention to make accurate predictions of interest regions as well as failure attributes identifying failure conditions will get better and better as the system is used in respect of any manner of kinds of monitoring locations.

Programming the monitoring software component and the adaptive object-detection function in a way that the function can be adapted over time will be understood to those skilled in the art. Details of object-detections made by the function, along with user interactions to accept or reject those detections or even the lack of user interactions to modify detections made will all be data points which can be saved in the process a method of the present invention and used to modify the mathematical model of the function and enhance its performance in intended application. Following the incorporation of such data points saved in the memory of the system into the model of the function, the data points might be maintained in longer-term storage or might be deleted—both such approaches are contemplated within the scope of the present invention

Sensor Data Stream

As outlined above, certain embodiments of the system of the present invention might include at least one sensor 40 connected to capture bus 25 of an endpoint device 11, whereby sensor readings of environmental or operating parameters of the equipment at the operating location 1 could be transmitted along with captured image data to the server 15 in image data transmissions for use in the recognition of failure attributes in images. The sensors 40 might comprise temperature sensors, pressure sensors, power consumption sensors or any number of different types of sensors which could capture relevant information regarding the environment or operating equipment at the monitoring location 1 and all such sensor types are contemplated within the scope of the present invention. Instead of a specific independently located sensor 40, the sensor 40 could also comprise the connection of the capture bus 25 of the endpoint device 11 to a pre-existing instrumentation datastream at the monitoring location 1—for example many monitoring locations 1 might already certain types of instrumentation and sensors that are already built-in and the system could allow for the inclusion of instrumentation data related thereto by facilitating a connection of the capture bus 25 of the endpoint device 11 to the instrumentation located at the monitoring location. This will also be understood to be within the scope of the present invention.

When one or more sensor readings from a sensor 40 at the monitoring location 1 are transmitted to the server 50 by the endpoint device 11 of the same time of the captured image from a digital camera 10, the sensor readings could be by the object-detection function and the remainder of the monitoring software component 17 to enhance the reliability and certainty of visual inspection otherwise generated by the software component 17 in the detection of failure attributes and the like.

Also, when a failure attribute is identified by the monitoring software component 17 and either accepted or rejected by user interaction with the server 15 by human interface device 19 when such identification is displayed to the user for verification and use, if the detected failure attribute is accepted or rejected by the user, the sensor readings from the at least one sensor contribute to the level of certainty and determination of the presence of such a failure attribute in the extracted image could be stored along with the remainder of the user interaction information for use in the subsequent adaptation of the function to enhance its future certainty in the identification of failure attributes. Various approaches can be taken to the incorporation of sensor data in the selection and verification of visual failure attribute cues in extracted images as well as to the enhancement of the accuracy of the adaptive object-detection function for future use based upon sensor readings captured and used by the function in the monitoring software component 17 the selection identification of failure attributes and all such approaches are contemplated within the scope of the present invention.

Human Interface Devices

Various embodiments of the system and method of the present tension will include at least one human interface device operatively connected server, for the purpose of displaying information in the course of the method to a user in respect of an monitoring location, as well as to permit user interaction with the server to allow for the acceptance or rejection of various object-detection results generated by the function displayed to the user course of the identification of interest regions, or failure indications and failure attributes detected in captured images from an endpoint at the monitoring location or locations.

In the case of a standalone installation, with a single server serving one or more monitoring locations of a single user, the human interface device may comprise a monitor and keyboard or the like directly connected to the server allowing the server to directly display information and interact with the user regarding object-detection results. FIG. 2 shows a sample embodiment of a system in accordance with the present invention having a single human interface device being a locally connected monitor and keyboard as an example.

In other embodiments it is specifically contemplated that the human interface devices used in embodiments where a plurality of monitoring locations of a plurality of users are being monitored, requiring reporting of results to different individuals for human verification and the like, the human interface devices might actually comprise remote client devices operatively connected the server via the network—the remote client devices might comprise smart phones, tablets, computers and the like. Those remote client devices might through a locally installed software application, or by browser communication with the server, being a server having Web server components, allow for the remote and likely wireless display of particular monitoring results to the display of the device of a remotely located user, for verification and follow-up human inspection. It will be understood that any type of a remote computing device which is connectable by the network to the server and capable of interacting with the server either by a locally installed application or through browser interface etc. could comprise a human interface device within the intended scope of the present invention and all such devices and remotely installed software and the like are contemplated within the scope of the types of human interface devices contemplated within the scope of the present invention.

Figure 8:
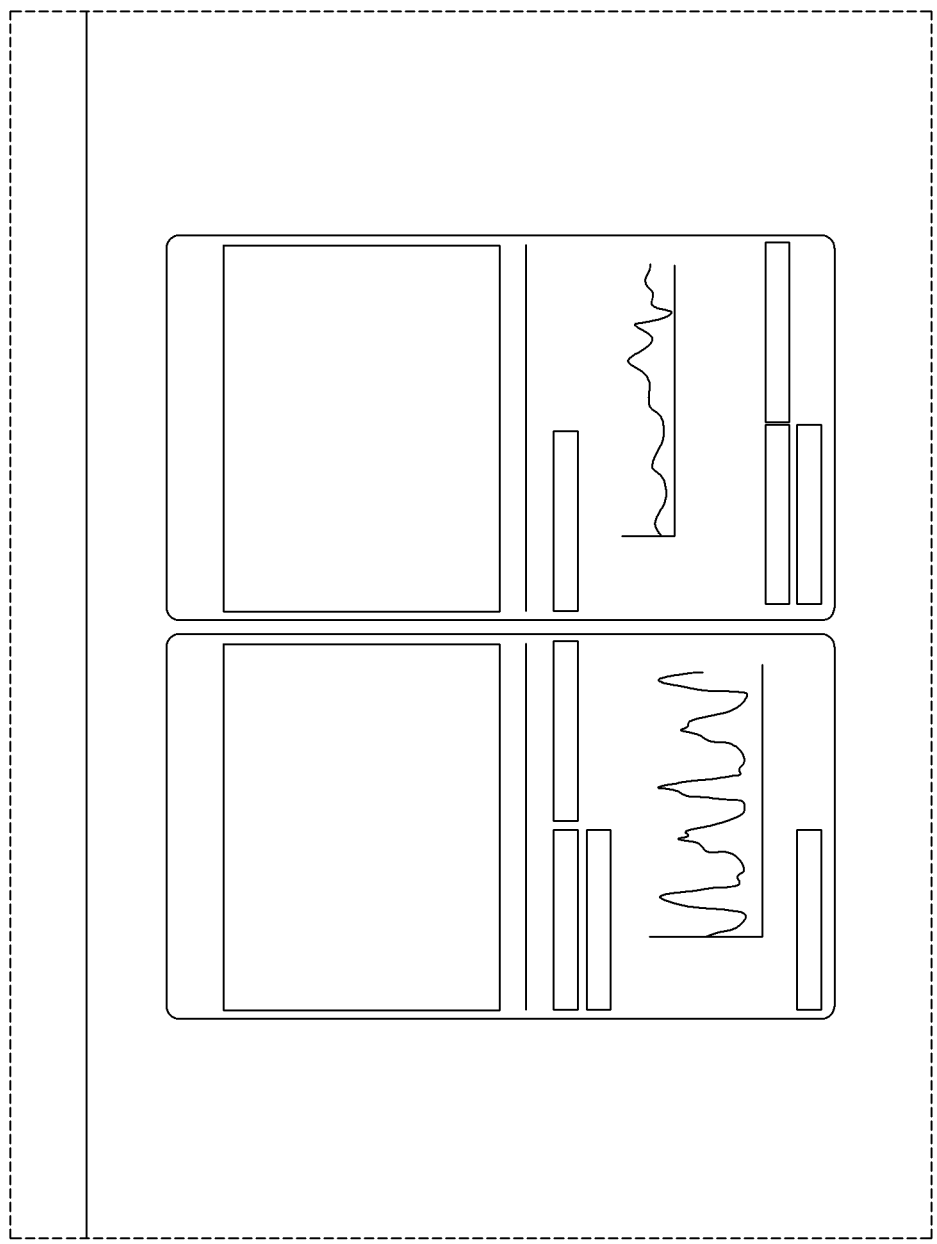
FIG. 8 is a screen shot of a sample display to a user via a human interface device upon the detection of at least one failure condition.

FIG. 8 is a sample of a screenshot of a human interface display showing a detected failure condition at a particular piping installation.

Network Interface

The network interfaces of the endpoint hardware devices as well as the server will be understood to be network interfaces capable of connection to a local area or wide area computer network enabling communication between these devices. It is specifically and primarily contemplated that the endpoint devices will communicate over a wireless network interface with the server—probably by a wireless Internet connection. However it will also be understood that a closed network could be used and that any type of a wired or wireless network connection permitting communication between the endpoint devices and the server and thus enabling the practice of the method of the present invention will be understood and contemplated to be within the scope of the present invention.

A local area network or wired network connection might particularly be used in the case of a large single monitoring location which had multiple endpoints or multiple cameras and a complicated hardware configuration with a locally hosted single server. In the more likely embodiments of the system and method of the present invention, namely the operation of the method and the server in a service Bureau configuration, wherein multiple users with multiple monitoring locations could share access to a single server operating the image detection method of the present invention, wireless network interfaces the more likely approach to be taken.

In embodiments of the system and method of the present invention human interface devices comprise at least some software interfaces on remote client devices operably connectable to the server by a network as well, the same or an additional network interface on the server could be used to allow the server to communicate with such remote client devices also.

Any type of a private or public network capable of allowing communication between the server and the endpoint devices or human interface devices will be understood to be a network contemplated within the scope of the present invention.

Method Overview

Figure 9:
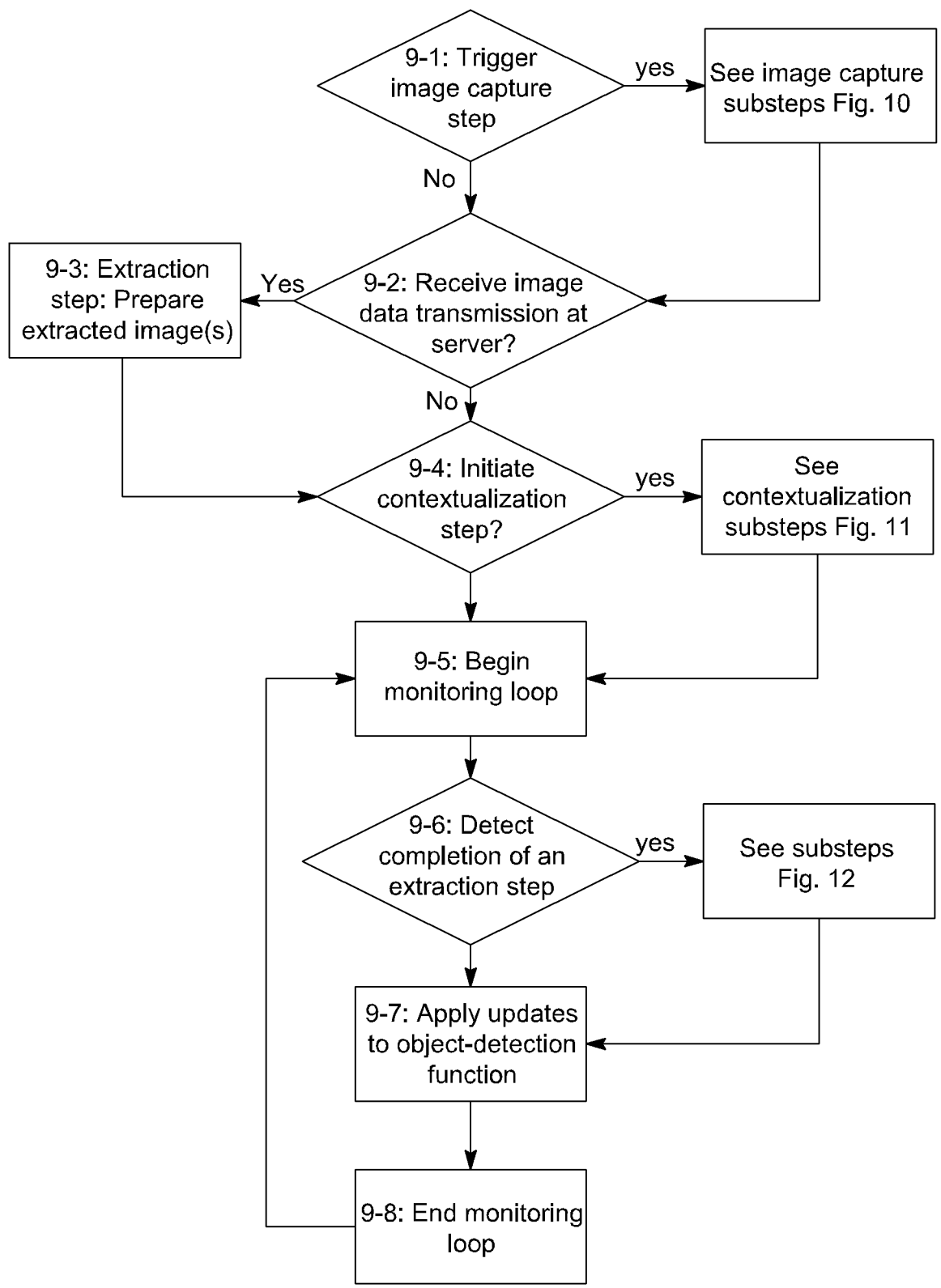
FIG. 9 is a flowchart demonstrating the steps in a basic embodiment of a method of the present invention.

The system of the present invention as described above is used to practice the method of computer-assisted visual monitoring of oilfield installations and the like to detect based upon visual inspection the presence of potential failure conditions requiring a further human inspection. Referring first to FIG. 9 there is shown a flow chart demonstrating the steps in a first embodiment of the method of the present invention.

The method is practised using a system in accordance with the present invention such as those otherwise outlined herein, specifically comprising a server, and endpoint device at each monitoring location being monitored, and at least one human interface device capable of receiving notifications and permitting user interactions with the server to accept, reject or modify particular recognitions, detections or recommendations made by the system.

Figure 10:
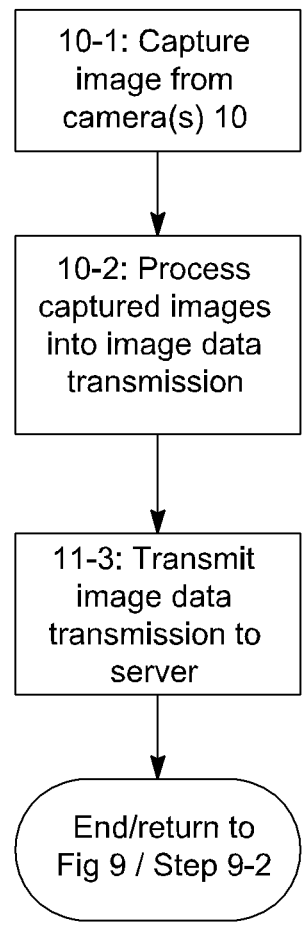
FIGS. 10 through 12 demonstrates sub-workflows of the primary method of FIG. 9.

The method will be executed by, in a first step, periodically executing an image capture step at each endpoint device—shown at 9-1. On the triggering of an image capture step the substeps of that process are shown in FIG. 10—the endpoint device 11 using the endpoint client software 23 would capture an image from at least one digital camera 10 connected to the captured bus 25 of the endpoint device 11. This image capture is shown at step 10-1. The image capture step 9-1 could, as outlined elsewhere herein, be triggered manually, periodically on the schedule, or based upon a sensor input or detection of some other condition at the monitoring location.

Where an image capture step is detected or triggered, shown at step 9-1, the substeps of the workflow associated therewith include first capturing an image from one or more cameras 10 connected endpoint device 11, shown at step 10-1 of FIG. 10. Following the capture of the images or images from the cameras in question, the captured images would be processed into an image data transmission, shown at step 10-2 and transmitted back to the server—step 10-3. Following the completion of this sub method, the control of the primary method would return to that of FIG. 9.

Upon the receipt of any image data transmission at the server, shown at step 9-2 as a decision block, if an image data transmission was received, extracted images would be extracted from the image data received in an extraction step 9-3. Upon the detection, completion or existence of one or more extracted images from the extraction step 9-3, further steps in the method could be conducted.

Figure 11:
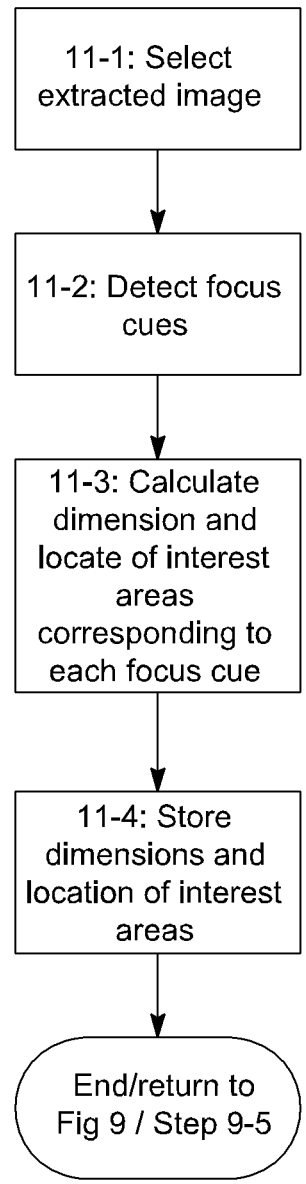

As outlined in the claims and elsewhere herein, the contextualization step shown at step 9-4 could be conducted upon the completion of each extraction step 9-3, or at a bare minimum at least once in respect of each camera view at a monitoring location. On the initialization of a contextualization of a camera view, the contextualization substeps are shown in FIG. 11. In a contextualization step, the first element of that workflow would be the selection of one or more extracted images of the particular camera view being contextualized—shown at step 11-1. These extracted images would have been recovered from extraction step related to an image transmission received from an endpoint device 11 at the monitoring location in question. The object detection function of the monitoring software component 17 would be applied to the at least one extracted image to detect the presence of any focus cues therein—see Step 11-2. The presence of automatically identified focused whose signifying interest regions in the image or images would be used to next calculate the dimensions and location of each interest region in the images in question which correspond to the focus cues located. Basically recognition of the presence of one or more focus cues in the image will be used to automatically identify the interest regions to be monitored visually by the system of the present invention—the calculation and location of the interest regions is shown at step 11-3.

Following the location and I mention calculation with respect to each interest region, the dimensions and location of the interest regions will be stored, shown at 11-4, and the camera view in question would at this point be a contextualized camera view in respect of which the necessary interest region information had been calculated for the purpose of subsequent monitoring thereof. Following the storage of the dimensions and location of the interest regions control of the method would return to the primary loop of FIG. 9.

Also shown in the flowchart of FIG. 9 is the monitoring loop—shown to begin at step 9-5. The monitoring loop effectively comprises examining each extracted image received in an image transmission from an endpoint device 11 to the server 15 to identify any potential failure conditions therein. The steps involved in the monitoring loop are shown in FIG. 12 as one example of this aspect of the method, which would be conducted upon the detection of the completion of an extraction step i.e. when the monitoring software component 17 detected the availability of one or more new extracted images from one or more camera views monitored by the system, each extracted image would be processed in accordance with the substeps of FIG. 12.

Figure 12:
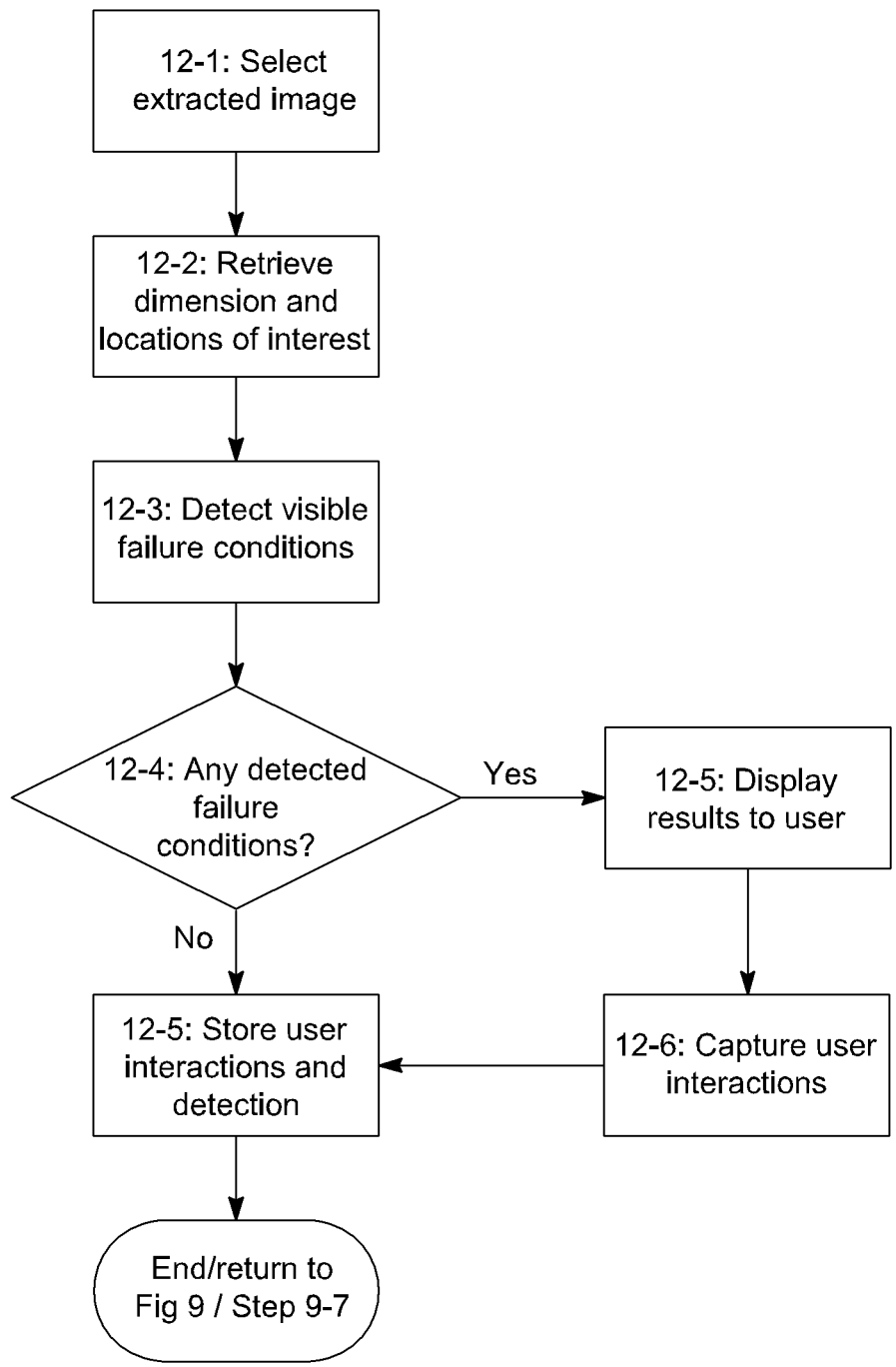

Referring to FIG. 12, the extracted image to be processed would be selected, shown at 12-1, and the dimensions and locations of interest regions in the extracted image, as it pertains to a contextualized camera view, would be retrieved from the memory of the server. This is shown at step 12-2. The interest regions with respect to the camera view in question could then be superimposed on the extracted image by the monitoring software component 17 and the object detection function would be applied to the extracted image to detect the presence of any visible failure conditions (shown at 12-3). If any failure detections were visibly detected by the monitoring software component 17—shown as a Boolean test at decision block 12-4—the results would be displayed to the user via a human interface device (12-5) and the user would be permitted to interact with the human interface device for the purpose of accepting, rejecting or modifying the identified failure conditions. The user interactions and detection results would be stored (12-7) and the control of the method would return to the primary workflow of FIG. 9.

Following the return to the workflow of FIG. 9 from the substeps of the monitoring loop where a new extracted image is determined to be available, step 9-7 shows the adaptation of the object detection function by the monitoring software component 17 based upon the detection results and any user interactions with the server. By modifying the mathematical function based upon user input and identification and detection results, the accuracy of the model can be continually enhanced.

The end of the monitoring loop is shown at step 9-8.

It will be understood that the image capture step, the extraction step, contextualization as well as the monitoring loop for the actual visual detection of failure conditions could be conducted in parallel or as all part of a single loop, rather than the specific workflow shown in FIG. 9 and any type of a conduct of methodology including these steps in any relevant order upon the initiation or completion of an image capture step 9-1 will all be understood to be within the scope of the present invention.

It is specifically contemplated that in certain embodiments of the method of the present invention a contextualization step would be conducted with respect to each new extracted image that became available with respect to particular camera view — in that case where each image was to be contextualized as well as process for the purpose of recognition of any visible failure conditions, the workflow of FIG. 9 would be altered to show the contextualization step inside the monitoring loop. It will be understood that many different types of approaches to the overarching method outlined in the claims and the remainder of this application could be constructed to allow for data processing and image processing in accordance with the present invention, without departing from the scope hereof, and any modified specific embodiment of the methodology and flowcharts that comes within the bounds of the claimed process and system are all contemplated to be encompassed herein.

Control Signal

It is explicitly contemplated that the system of the present invention might also include a control signal functionality wherein the server 15 could upon the detection with a high level of certainty of a failure condition at a particular monitoring location, would have an interface by which a control signal could be dispatched to equipment operating at the monitoring location to shut down the equipment where a leak or other failure has been detected. The addition of a control interface to the server and/or the endpoint device to facilitate this added shutdown functionality will be understood to also be within the scope of the present invention.

Past or Future Detection

It is explicitly contemplated that by identifying preexisting anomalies in images such as contamination or spills or the like, an already occurred leak could be identified for example. In other embodiments, the system and method of the present invention could be used to predictably identify future failures based upon either image data received or else based upon a sensor data stream i.e. for example nonconforming power consumption, pressure and temperature readings of the like could indicate, freestanding or in conjunction with image results, the likelihood of a looming failure of a particular type of a component. Again both types of approaches are contemplated within the scope of the present invention.

It will be apparent to those of skill in the art that by routine modification the present invention can be optimized for use in a wide range of conditions and application. It will also be obvious to those of skill in the art that there are various ways and designs with which to produce the apparatus and methods of the present invention. The illustrated embodiments are therefore not intended to limit the scope of the invention, but to provide examples of the apparatus and method to enable those of skill in the art to appreciate the inventive concept.

Those skilled in the art will recognize that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. The terms "comprises" and "comprising" should be interpreted as referring to elements, components, or steps in a non-exclusive manner, indicating that the referenced elements, components, or steps may be present, or utilized, or combined with other elements, components, or steps not expressly referenced.

What is claimed is:

1. A method of remote visual inspection and failure detection at a plurality of monitoring locations, the method comprising:
    providing an endpoint device at each monitoring location connected to a network via an endpoint network interface, each endpoint device comprising:
        at least one digital camera positioned with a camera view of the monitoring location;
        a capture bus connected to and configured to receive image data from the at least one digital camera;
        the endpoint network interface; and
        endpoint client software configured to facilitate the capture of images from the at least one camera, and the construction and transmission of image data transmissions to the remote server;
    providing a server comprising:
        a processor and a memory;
        a server network interface via which the server communicates with external devices via the network;
        at least one human interface device permitting graphic display and user interaction with a user; and
        a monitoring software component comprising processor instructions to facilitate the conduct of the method via the server, the monitoring software component including an adaptive object-detection function for the image detection of:
            focus cues indicating interest regions in images of monitoring locations corresponding to high-probability failure areas for ongoing visual inspection; and
            visible failure attributes indicating the potential existence of failure conditions at a monitoring location;
    in a contextualization step, using the server and the monitoring software component to contextualize each monitoring location in respect of each camera view by:
        selecting a captured image of the camera view received from the corresponding endpoint device;
        applying the object-detection function to detect the presence of any focus cues within the captured image;
        using each detected focus cue to calculate a desired dimension and location of a corresponding interest region in the captured image; and
        storing the dimensions and location of each interest region in respect of the corresponding camera view, now being a contextualized camera view, in the memory of the server;
    periodically executing an image capture step at each endpoint device by:
        capturing an image from at least one connected digital camera;
        processing the image data corresponding to each captured image for transmission to the server as an image data transmission; and
        transmitting the image data transmission to the server via the network;

in a monitoring loop using the server and monitoring software component:
  on receipt of an image data transmission at the server from an endpoint device:
    executing an extraction step wherein the extracted images corresponding to contextualized camera views at the location of the endpoint device are extracted therefrom;
    for each extracted image:
      applying the stored dimensions and location of each interest region in the corresponding contextualized camera view stored in the memory of the server to the extracted image, identifying defined interest regions in the extracted image;
      applying the object-detection function to each defined interest region of the extracted image to detect the presence of any visible failure attributes therein; and
      on detection of any visible failure attributes within a defined interest region which might signify a failure condition, executing a notification step by:
        displaying to a user via a human interface device at least the portion of the extracted image corresponding to the defined interest region containing the detected failure attributes;
        permitting the user to validate, reject or modify the detected failure attributes; and
        storing any user validation, rejection or modification indications of the user with respect to the detected failure attributes
  wherein the monitoring software component adapts the adaptive object-detection function based upon the stored user interactions from notifications of failure condition detections to enhance its level of accuracy and certainty in future failure attribute and condition detections.

2. The method of claim 1, wherein the notification step further comprises displaying additional information to the user selected from the group of:
  visual identification of failure attributes detected indicated on the extracted image which contribute to the determination of the existence of the detected failure condition; and
  a calculated confidence score in respect of the detected failure condition.

3. The method of claim 1, wherein an endpoint device has more than one camera connected thereto.

4. The method of claim 3, wherein the camera view of more than one camera encompasses the same area of the monitoring location, whereby the level of certainty in failure detection within the monitoring location is maximized by processing of multiple camera view images.

5. The method of claim 1, wherein the focus cues recognized by the object-detection function are selected from the group of:
  detected interfaces between equipment and the environment;
  detected interfaces between components of equipment;
  elements of the surrounding environment;
  detected equipment which has a purpose related to leak containment, mitigation, fluid presence or tank levels; and
  physical framing elements positioned in the view of the corresponding cameras.

6. The method of claim 1, wherein the contextualization step in respect of a particular monitoring location and camera view further comprises, following the dimensioning and location of the interest regions:
  using a human interface device, displaying the extracted image to a user via a human interface device along with an overlay of the position and dimension of each interest region, and permitting the user to validate, reject or modify the dimensions and location of the interest regions; and
  adapting the object-detection function based upon the user interactions validating, rejecting or modifying the detected focus cues and the dimensions and locations of the interest regions to enhance its level of accuracy and certainty in future contextualization and interest region rendering.

7. The method of claim 1, wherein the detected failure attributes used to determine the existence of a failure condition within an interest region include:
  color contrast in the image;
  colors within the image;
  textures within the image;
  relative position of detected edges in the image;
  relative orientation and angle of edges or contrasting regions in the image; or
  identification of data patterns correlating to failure conditions.

8. The method of claim 1, wherein the endpoint device further comprises at least one sensor connected to the capture bus and operative to read operating or environmental parameter values at the monitoring location, and wherein the image data transmissions to the server from the related endpoint device will include the parameter values.

9. The method of claim 8, wherein the monitoring software component uses the parameter values contained within the image data transmission along with failure attributes detected in associated interest regions in the determination of the existence of any failure conditions.

10. The method of claim 8, wherein the monitoring software component will use the parameter values contained within the image data transmission along with failure attributes detected in associated interest regions in the determination of the existence of any failure conditions, to adapt the monitoring software component to enhance its level of accuracy and certainty in future failure condition detections.

11. The method of claim 8, wherein the endpoint client software triggers the generation of an image data transmission to the server based upon a current parameter value of at least one connected sensor.

12. The method of claim 1, wherein the endpoint client software is programmed to originate an image data transmission to the server on a time-based or scheduled frequency.

13. The method of claim 1, wherein the at least one digital camera is selected from the group of:
  regular image cameras;
  cameras configured to receive any spectrum of light and generate an image output;
  infrared cameras; and
  cameras configured to detect gas.

14. The method of claim 1, wherein the image captured from at least one digital camera is a still image.

15. The method of claim 1, wherein the image captured from at least one digital camera is a video image.

16. The method of claim 1, wherein each human interface device comprises a human interface of a remote client device operatively connected to the server by the network.

17. A system for remote visual facilities inspection and failure detection at a plurality of monitoring locations, the system comprising:
- an endpoint device at each monitoring location connected to a network via an endpoint network interface, each endpoint device comprising:
  - at least one digital camera positioned with a camera view of the monitoring location;
  - a capture bus connected to and configured to receive image data from the at least one digital camera;
  - the endpoint network interface; and
  - endpoint client software configured to facilitate the capture of images from the at least one camera and the construction and transmission of image data transmissions to a remote server; and
- a server comprising:
  - a processor and a memory;
  - a server network interface via which the server can communicate with external devices via the network; and
  - a monitoring software component comprising the necessary processor instructions to facilitate the conduct of the method via the server, the monitoring software component including an adaptive object-detection function for the image detection of:
    - focus cues indicating interest regions in images of monitoring locations corresponding to high-probability failure areas for ongoing visual inspection; and
    - visible failure attributes indicating the potential existence of failure conditions at a monitoring location; and
- at least one human interface device operatively connected to the server permitting graphic display and user interaction with a user;
- wherein the system facilitates the methods by:
  - in a contextualization step, use the server and the monitoring software component to contextualize each monitoring location in respect of each camera view by:
    - selecting a captured image of the camera view received from the corresponding endpoint device;
    - applying the object-detection function to detect the presence of any focus cues within the captured image;
    - using each detected focus cue to calculate a desired dimension and location of a corresponding interest region in the extracted image; and
    - storing the dimensions and location of each interest region in respect of the corresponding camera view, now being a contextualized camera view, in the memory of the server;
  - periodically executing an image capture step at each endpoint device by:
    - capturing an image from at least one connected digital camera;
    - processing the image data corresponding to each captured image for transmission to the server as an image data transmission; and
    - transmitting the image data transmission to the server via the network;
  - in a monitoring loop, using the server and monitoring software component:
    - on receipt of an image data transmission at the server from an endpoint device:
      - executing an extraction step wherein the extracted images corresponding to contextualized camera views at the location of the endpoint device are extracted therefrom;
      - for each extracted image:
        - applying the stored dimensions and location of each interest region in the corresponding contextualized camera view stored in the memory of the server to the extracted image, identifying defined interest regions in the extracted image;
        - applying the object-detection function to each defined interest region of the extracted image to detect the presence of any visible failure attributes therein; and
        - on detection of any visible failure attributes within a defined interest region which might signify a failure condition, executing a notification step by:
          - displaying to a user via a human interface device at least the portion of the extracted image corresponding to the defined interest region containing the detected failure attributes;
          - permitting the user to validate, reject or modify the detected failure attributes; and
          - storing any user validation, rejection or modification indications of the user with respect to the detected failure attributes
    - wherein the monitoring software component adapts the adaptive object-detection function based upon the stored user interactions from notifications of failure condition detections to enhance its level of accuracy and certainty in future failure attribute and condition detections.

18. The system of claim 17, wherein the notification step further comprises displaying additional information to the user via the human interface device selected from the group of:
- visual identification of the failure attributes detected indicated on the extracted image which contribute to the determination of the existence of the failure condition; and
- a calculated confidence score in respect of the identified failure condition.

19. The system of claim 17, wherein the focus cues recognized by the object-detection function to identify interest regions are selected from the group of:
- detected interfaces between equipment and the environment;
- detected interfaces between components of equipment;
- elements of the surrounding environment;
- detected equipment which has a purpose related to leak containment, mitigation, fluid presence or tank levels; or
- physical framing elements positioned in the view of the corresponding cameras.

20. The system of claim 17, wherein the contextualization step in respect of a particular monitoring location and camera view further comprises, following the dimensioning and location of the interest regions:
- using a human interface device, displaying the extracted image to a user via a human interface device along with an overlay of the position and dimension of each determined interest region and permitting the user to validate, reject or modify the dimensions and location of the interest regions; and
- adapting the object-detection function based upon the user interactions validating, rejecting or modifying the detected focus cues and the dimensions and locations of the interest regions to enhance its level of accuracy and certainty in future contextualization and interest region rendering.

21. The system of claim 17, wherein the detected failure attributes used to determine the existence of a failure condition within an interest region include:
    color contrast in the image;
    colors within the image;
    textures within the image;
    relative position of detected edges in the image;
    relative orientation and angle of edges or contrasting regions in the image; or
    identification of data patterns correlating to failure conditions.

22. The system of claim 17, wherein the endpoint device further comprises at least one sensor connected to the capture bus and operative to read operating or environmental parameter values at the monitoring location, and wherein the image data transmissions to the server from the related endpoint device will include the parameter values.

23. The system of claim 22, wherein the adaptive object-detection function uses the parameter values contained within the image data transmission along with failure attributes detected in associated interest regions in the determination of the existence of any failure conditions.

24. The system of claim 22, wherein the monitoring software component uses the parameter values contained within the image data transmission along with failure attributes detected in associated interest regions in the determination of the existence of any failure conditions, to adapt the monitoring software component to enhance its level of accuracy and certainty in future failure condition detections.

25. The system of claim 17, wherein the endpoint client software triggers the generation of an image data transmission to the server based upon a current parameter value of at least one connected sensor.

26. The system of claim 17, wherein the endpoint client software is programmed to originate an image data transmission to the server on a time-based or scheduled frequency.

27. The system of claim 17, wherein the at least one digital camera is selected from the group of:
    regular image cameras;
    cameras configured to receive any spectrum of light and generating an image output;
    infrared cameras; and
    cameras configured to detect gas.

28. The system of claim 17, wherein the image captured from the at least one digital camera is a still image.

29. The system of claim 17, wherein the image captured from the at least one digital camera is a video image.

30. The system of claim 20, wherein each human interface device comprises a human interface of a remote client device operatively connected to the server by the network.

31. A server for use in a method of remote visual inspection and failure detection at a plurality of monitoring locations, the server comprising:
    a processor and a memory;
    a network interface via which the server can communicate with:
        at least one endpoint device corresponding to a monitoring location and comprising:
            a capture bus configured to receive image data from at least one connected digital camera;
            the at least one digital camera positioned with a camera view of the monitoring location, and connected to the capture bus;
            a network interface by which the endpoint device can transmit image data corresponding to images captured by the at least one camera to the server; and
            endpoint client software configured to facilitate the capture of images from the at least one camera, the construction and transmission of image data transmissions corresponding to a particular point in time image capture from the at least camera attached thereto to a remote server;
        at least one human interface device permitting graphic display and user interaction with a user; and
        a monitoring software component comprising the necessary processor instructions to facilitate the conduct of the method via the server, the monitoring software component including an adaptive object-detection function for the image detection of:
            focus cues indicating interest regions in images of monitoring locations corresponding to high-probability failure areas for ongoing visual inspection; and
            visible failure attributes indicating the potential existence of failure conditions at a monitoring location;
    wherein the server is configured to administer a method comprising:
        contextualizing each monitoring location in respect of each camera view by:
            selecting a captured image of the camera view received from the corresponding endpoint device;
            applying the object-detection function to detect the presence of any focus cues within the captured image;
            using each detected focus cue to calculate a desired dimension and location of a corresponding interest region in the extracted image; and
            storing the dimensions and location of each interest region in respect of the corresponding camera view, now being a contextualized camera view, in the memory of the server;
        in a monitoring loop using the server and monitoring software component:
            on receipt of an image data transmission at the server from an endpoint device:
                executing an extraction step wherein the extracted images corresponding to contextualized camera views at the location of the endpoint device are extracted therefrom;
                for each extracted image:
                    applying the stored dimensions and location of each interest region in the corresponding contextualized camera view stored in the memory of the server to the extracted image, identifying defined interest regions in the extracted image;
                    applying the object-detection function to each defined interest region of the extracted image to detect the presence of any visible failure attributes therein; and
                    on detection of any visible failure attributes within a defined interest region which might signify a failure condition, executing a notification step by:
                        displaying to a user via a human interface device at least the portion of the extracted image corresponding to the defined interest region containing the detected failure attributes;
permitting the user to validate, reject or modify the detected failure attributes; and
storing any user validation, rejection or modification indications of the user with respect to the detected failure attributes wherein the monitoring software component adapts the adaptive object-detection function based upon the stored user interactions from notifications of failure condition detections to enhance its level of accuracy and certainty in future failure attribute and condition detections.

32. The server of claim 21, wherein the notification step further comprises displaying additional information to the user via the human interface device selected from the group of:
visual identification of the failure attributes detected imposed on the extracted image which contribute to the determination of the existence of the failure condition; and
a calculated confidence score in respect of the identified failure condition.

33. The server of claim 31, wherein each human interface device comprises a human interface of a remote client device operatively connected to the server by the network.

34. The server of claim 31, wherein the focus cues recognized by the object-detection function to identify interest regions are selected from the group of:
detected interfaces between equipment and the environment;
detected interfaces between components of equipment;
elements of the surrounding environment;
detected equipment which has a purpose related to leak containment, mitigation, fluid presence or tank levels; or
physical framing elements positioned in the view of the corresponding cameras.

35. The server of claim 31, wherein the contextualization step in respect of a particular monitoring location and camera view further comprises, following the dimensioning and location of the interest regions:
displaying the extracted image to a user via a human interface device along with an overlay of the position and dimension of each interest region;
permitting the user to validate, reject or modify the dimensions and location of the interest regions; and
adapting the object-detection function based upon the user interactions validating, rejecting or modifying the detected focus cues and the dimensions and locations of the interest regions to enhance its level of accuracy and certainty in future contextualization and interest region rendering.

36. The server of claim 31, wherein the detected failure attributes used to determine the existence of a failure condition within an interest region include:
color contrast in the image;
colors within the image;
textures within the image;
relative position of detected edges in the image;
relative orientation and angle of edges or contrasting regions in the image; or
identification of data patterns correlating to failure conditions.

37. The server of claim 31, wherein image data transmissions to the server from an endpoint device include the operating or environmental parameter values of the at least one sensor at the monitoring location.

38. The server of claim 37, wherein the adaptive object-detection function uses the parameter values contained within the image data transmission along with failure attributes detected in associated interest regions in the determination of the existence of any failure conditions.

39. The server of claim 37, wherein the monitoring software component uses the parameter values contained within the image data transmission along with failure attributes detected in associated interest regions in the determination of the existence of any failure conditions, to adapt the monitoring software component to enhance its level of accuracy and certainty in future failure condition detections.

* * * * *